United States Patent
Gatos et al.

(10) Patent No.: US 10,414,138 B2
(45) Date of Patent: Sep. 17, 2019

(54) REINFORCED THIN FILM FOR FLEXIBLE PACKAGING

(75) Inventors: Konstantinos G. Gatos, Evia (GR); Anthony G. Karandinos, Glyfada (GR)

(73) Assignee: MEGAPLAST S.A. PACKAGING MATERIALS INDUSTRY, Heraklion (GR)

( * ) Notice: Subject to any disclaimer, the term of this patent is extended or adjusted under 35 U.S.C. 154(b) by 306 days.

(21) Appl. No.: 13/392,156

(22) PCT Filed: Sep. 3, 2010

(86) PCT No.: PCT/EP2010/062989
§ 371 (c)(1),
(2), (4) Date: May 2, 2012

(87) PCT Pub. No.: WO2011/026954
PCT Pub. Date: Mar. 10, 2011

(65) Prior Publication Data
US 2012/0288669 A1    Nov. 15, 2012

(30) Foreign Application Priority Data
Sep. 4, 2009   (GB) ................................. 0915425.3

(51) Int. Cl.
*B32B 3/30* (2006.01)
*B32B 3/24* (2006.01)
(Continued)

(52) U.S. Cl.
CPC ............ *B32B 27/32* (2013.01); *B29C 48/08* (2019.02); *B29C 48/10* (2019.02); *B29C 48/12* (2019.02);
(Continued)

(58) Field of Classification Search
CPC ............ B29C 47/0014; B29C 47/0019; B29C 47/0021; B29C 47/003; B29C 47/0033;
(Continued)

(56) References Cited

U.S. PATENT DOCUMENTS 4,235,062 A   11/1980   Lancaster et al.
4,452,666 A    6/1984   Dorman
(Continued)

FOREIGN PATENT DOCUMENTS

DE      29519905      4/1997
DE      10201480      7/2003
(Continued)

OTHER PUBLICATIONS

International Search Report and Written Opinion for PCT/EP2010/062989 dated Mar. 8, 2011.
(Continued)

*Primary Examiner* — Nancy R Johnson
(74) *Attorney, Agent, or Firm* — Christopher M. Scherer; DeWitt LLP

(57) ABSTRACT

The invention provides a thermoplastic film comprising: a base film wherein the base film comprises a stretchable polyolefin material comprising one or more layers; and a plurality of extruded fiber elements; wherein the extruded fiber elements are located on at least one surface of the base film; wherein the extruded fibers form one or more protrusions relative to the plane of the base film; wherein at the location where the fiber elements are provided on the base film, a domain of a material mixture comprising the base film material and the fiber material is present between a domain of pure base film material and a domain of pure fiber material, and wherein the average thickness of the base film is less than the average thickness of the protrusion.

46 Claims, 7 Drawing Sheets

(51) Int. Cl.

| | | |
|---|---|---|
| *B32B 37/15* | (2006.01) | |
| *B32B 27/32* | (2006.01) | |
| *B32B 5/08* | (2006.01) | |
| *B32B 7/02* | (2019.01) | |
| *B32B 27/08* | (2006.01) | |
| *B32B 3/08* | (2006.01) | |
| *B32B 3/26* | (2006.01) | |
| *B29C 48/08* | (2019.01) | |
| *B29C 48/10* | (2019.01) | |
| *B29C 48/12* | (2019.01) | |
| *B29C 48/13* | (2019.01) | |
| *B29C 48/19* | (2019.01) | |
| *B29C 48/20* | (2019.01) | |
| *B29C 48/21* | (2019.01) | |
| *B29K 23/00* | (2006.01) | |
| *B29K 67/00* | (2006.01) | |
| *B29K 77/00* | (2006.01) | |
| *B29K 105/00* | (2006.01) | |
| *B29K 223/00* | (2006.01) | |
| *B29C 48/155* | (2019.01) | |
| *B29C 48/17* | (2019.01) | |
| *B29C 48/22* | (2019.01) | |
| *B29C 48/23* | (2019.01) | |

(52) U.S. Cl.
CPC .............. *B29C 48/13* (2019.02); *B29C 48/19* (2019.02); *B29C 48/20* (2019.02); *B29C 48/21* (2019.02); *B32B 3/085* (2013.01); *B32B 3/266* (2013.01); *B32B 5/08* (2013.01); *B32B 7/02* (2013.01); *B32B 27/08* (2013.01); *B29C 48/155* (2019.02); *B29C 48/17* (2019.02); *B29C 48/22* (2019.02); *B29C 48/23* (2019.02); *B29K 2023/06* (2013.01); *B29K 2023/0608* (2013.01); *B29K 2023/0616* (2013.01); *B29K 2023/0625* (2013.01); *B29K 2023/0633* (2013.01); *B29K 2023/12* (2013.01); *B29K 2067/00* (2013.01); *B29K 2077/00* (2013.01); *B29K 2105/0008* (2013.01); *B29K 2105/256* (2013.01); *B29K 2223/06* (2013.01); *B29K 2223/0633* (2013.01); *B32B 2250/24* (2013.01); *B32B 2262/0253* (2013.01); *B32B 2262/12* (2013.01); *B32B 2307/402* (2013.01); *B32B 2307/50* (2013.01); *B32B 2307/514* (2013.01); *B32B 2307/54* (2013.01); *B32B 2307/546* (2013.01); *B32B 2307/5825* (2013.01); *B32B 2307/718* (2013.01); *B32B 2410/00* (2013.01); *B32B 2553/00* (2013.01); *Y10T 428/2495* (2015.01); *Y10T 428/24322* (2015.01); *Y10T 428/249921* (2015.04); *Y10T 428/266* (2015.01); *Y10T 428/269* (2015.01)

(58) Field of Classification Search
CPC ........... B32B 27/32; B32B 3/08; B32B 3/085; B32B 3/16; B32B 3/26; B32B 3/266; Y10T 428/2495; Y10T 428/266; Y10T 428/24322; Y10T 428/269
USPC .......... 428/137, 221, 339, 213, 337; 156/167
See application file for complete search history.

(56) References Cited

U.S. PATENT DOCUMENTS

| | | |
|---|---|---|
| 4,488,918 A | 12/1984 | Jofs |
| 4,536,362 A | 8/1985 | Donaldson |
| 4,754,594 A | 7/1988 | Lancaster |
| 5,935,681 A | 8/1999 | Paulett |
| 6,969,548 B1 | 11/2005 | Goldfine |
| 2001/0016245 A1 | 8/2001 | Tuman et al. |
| 2004/0178544 A1 | 9/2004 | Jackson et al. |
| 2005/0118391 A1 | 6/2005 | Kavvadias et al. |
| 2005/0123720 A1* | 6/2005 | Suzuki et al. ................ 428/131 |
| 2005/0123721 A1 | 6/2005 | Heikaus et al. |
| 2005/0175805 A1 | 8/2005 | Hild et al. |
| 2006/0049190 A1 | 3/2006 | Middleton et al. |
| 2006/0194495 A1 | 8/2006 | Lubker, II |
| 2008/0280098 A1 | 11/2008 | Papadopoulos et al. |
| 2008/0311365 A1* | 12/2008 | Tukachinsky ................ 428/220 |
| 2009/0047468 A1* | 2/2009 | Papadopoulos et al. ..... 428/121 |
| 2009/0047855 A1* | 2/2009 | Seth .................... A61F 13/4902 442/329 |
| 2010/0075103 A1* | 3/2010 | Miyamoto .......... A61F 13/4902 428/114 |

FOREIGN PATENT DOCUMENTS

| | | |
|---|---|---|
| EP | 0145499 | 6/1985 |
| EP | 0337719 | 10/1989 |
| EP | 0300855 | 12/1991 |
| EP | 0816056 | 1/1998 |
| EP | 0820856 | 1/1998 |
| EP | 0909721 | 4/1999 |
| EP | 0923866 | 6/1999 |
| EP | 099037 | 5/2000 |
| EP | 1568485 | 8/2005 |
| EP | 1967357 | 9/2008 |
| GB | 2316341 | 2/1998 |
| WO | 9816177 | 4/1998 |
| WO | 0112000 | 2/2001 |
| WO | 200160709 | 8/2001 |
| WO | 02055311 | 7/2002 |
| WO | 2002094674 | 11/2002 |
| WO | 03059750 | 7/2003 |
| WO | 2004022634 | 3/2004 |
| WO | 2004033310 | 4/2004 |
| WO | 2004078869 | 9/2004 |
| WO | 2004080695 | 9/2004 |
| WO | 2005021240 | 3/2005 |
| WO | 2005087608 | 9/2005 |
| WO | 2006018028 | 2/2006 |
| WO | 2006076917 | 7/2006 |

OTHER PUBLICATIONS

International Search Report for PCT/EP2010/062990 dated Jan. 17, 2011.

* cited by examiner

REINFORCED THIN FILM FOR FLEXIBLE PACKAGING

CROSS REFERENCE TO RELATED APPLICATION

The present application is the U.S. national stags application of International Application PCT/EP2010/062989, filed Sep. 4, 2010, which international application was published on Mar. 10, 2011, as International Publication WO2011/026954. The International Application claims priority of British Patent Application 0915425.3, filed Sep. 4, 2009, the contents of which are incorporated herein by reference in their entireties.

FIELD OF THE INVENTION

This invention relates to a thin film for flexible packaging.

In particular, the present invention is directed to a specially reinforced thin film for flexible packaging having controllable properties such as, tensile strength, elongation at break, tear resistance, coefficient of friction, adhesion, weight per meter, colour and bio-properties. The articles of the present invention can be silage, stretch, pre-stretched stretch and hood film and they can be produced by known methods of extrusion or co-extrusion such as cast, blown and the like. The film is characterized by a much lower weight with respect to the known films in the art having similar and/or improved mechanical characteristics.

BACKGROUND OF THE INVENTION

Film for flexible packaging is used for a multitude of applications. For a stretch hood, as described in WO2006/076917 A1, the hood is formed from a biaxially oriented tubular film having a seam. In this application, the seam provides flexibility in sizing the hood but reinforcement for demanding packaging applications is missing. In case of baling forage or hay, EP0923866 A1 presents a stretch film provided with a pest deterrent, which increases the cost and the weight of the product considerably.

Several cases are known in the art where the reinforcing phase is located in a specific layer, thus, creating laminate structures in the film. In US2005/0175805 A1 a plurality of fibres are dispersed between two thermoplastic layers made during a blown process. This fibre-reinforced film, which is mainly formed into a bag, consists of an inner layer of randomly dispersed fibres, thus, discontinuities in fibre volume fraction per film unit length appear. This produces uneven reinforcement.

Co-extruded reinforced film for packaging has received increased attention over the last few years. U.S. Pat. No. 4,536,362 discloses a longitudinally ribbed plastic film by extrusion through a special designed die-head. Similarly, in WO2005/021240 A1 the longitudinal co-extruded thicker regions are aimed to strengthen the film. In these documents where inexpensive reinforced packaging film is targeted, uncontrollable thickness fluctuation and thus, property variation, appears. Additionally, the overall reinforcement is provided by the increased cross-section of the thicker section and not by its inherent enhanced properties.

To this end, it should be noted that reinforced extendible systems are already available on the market provided with longitudinal reinforcing strips which are fastened to a film to increase its mechanical strength in the longitudinal direction even if its weight is kept low. It is evident that such reinforced systems of the known type need a coupling between the film to be reinforced and the reinforcing strips which have to be applied thereto. This adds additional processing to the usual operations of production and thus, additional cost. The same holds for embodiments where perforated reinforced packaging film is exploited for wrapping packed products, which need aeration.

In certain embodiments where thin flexible packaging with enhanced tensile strength in the machine direction is needed, the prior art has proposed either single wide reinforcing strips or folded/overlapped reinforcing elements. These, however, cause a prominent weight increase and debonding effects.

The use of stretch films of polyethylene for packaging or unitizing goods is known. In heavy applications depending on the weight and size of goods, films with different characteristics (strength, thickness, tack, slip) are exploited.

For a film producer the major cost comes from polyethylene raw-material. It is therefore understood that the packaging cost increases in proportion to the thickness. Therefore, it is useful to decrease the thickness of the films for packaging to reduce their production cost.

Furthermore, the waste volume and weight obtained by packaging or unitizing goods is also dependent on the thickness of the film. Thus, reducing the thickness leads to less waste volume and weight.

An important feature of reinforced thermoplastic films is the strength of the link between base film and reinforcing element. Strengthening of this link/bond can be achieved by coupling agents or process steps to ensure the stability.

The object of the present invention is to overcome the problems mentioned above.

SUMMARY OF THE INVENTION

The object is solved by the claims of the present invention.

In a first aspect of the invention, there is provided a thermoplastic film comprising:
 a base film wherein the base film comprises a stretchable polyolefin material comprising one or more layers; and
 a plurality of extruded fibre elements;
 wherein the extruded fibre elements are located on at least one surface of the base film;
 wherein the extruded fibres form one or more protrusions relative to the plane of the base film;
 wherein at the location where the fibre elements are provided on the base film, a domain of a material mixture comprising the base film material and the fibre material is present between a domain of pure base film material and a domain of pure fibre material, and
 wherein the average thickness of the base film is less than the average thickness of the protrusion.

In a second aspect of the invention, there is provided a method of producing a thermoplastic film comprising:
 (i) extruding a base film comprising a stretchable polyolefin material comprising one or more layers;
 (ii) extruding a plurality of fibre elements;
 (iii) applying the plurality of fibre elements to at least one side of the base film; and
 (iv) bonding the fibre elements to the base film;
 wherein the extruded fibres form one or more protrusions relative to the plane of the base film;
 wherein at the location where the fibre elements are provided on the base film, a domain of a material mixture comprising the base film material and the fibre material is present between a domain of pure base film material and a domain of pure fibre material, and wherein the average thickness of the base film is less than the average thickness of the protrusion.

In a third aspect of the invention, there is provided a thermoplastic film intermediate comprising:
(i) an extruded base film comprising a stretchable polyolefin material comprising one or more layers; and
(ii) a plurality of extruded fibre elements;
wherein the fibre elements are placed at least on one surface of said base film;
wherein the extruded fibre elements form one or more protrusions relative to the plane of the base film; and
wherein the average thickness of the base film is less than the average thickness of the protrusion.

In a fourth aspect of the invention, the thermoplastic film is provided on a roll.

In a fifth aspect of the invention, the thermoplastic film is used in packaging.

In a sixth aspect of the present invention, there is provided a thermoplastic film obtainable by the steps comprising:
(i) extruding a base film comprising a stretchable polyolefin material comprising one or more layers;
(ii) extruding a plurality of fibre elements;
(iii) applying the plurality of fibre elements to at least one side of the base film; and
(iv) bonding the fibre elements to the base film;
wherein the extruded fibres form one or more protrusions relative to the plane of the base film;
wherein at the location where the fibre elements are provided on the base film, a domain of a material mixture comprising the base film material and the fibre material is present between a domain of pure base film material and a domain of pure fibre material, and
wherein the average thickness of the base film is less than the average thickness of the protrusion.

BRIEF DESCRIPTION OF THE DRAWINGS

Further features and advantages of the reinforced thermoplastic film according to the present invention become apparent from the following description of exemplary embodiments thereof taken in conjunction with the accompanying drawings, wherein.

Figure 1:
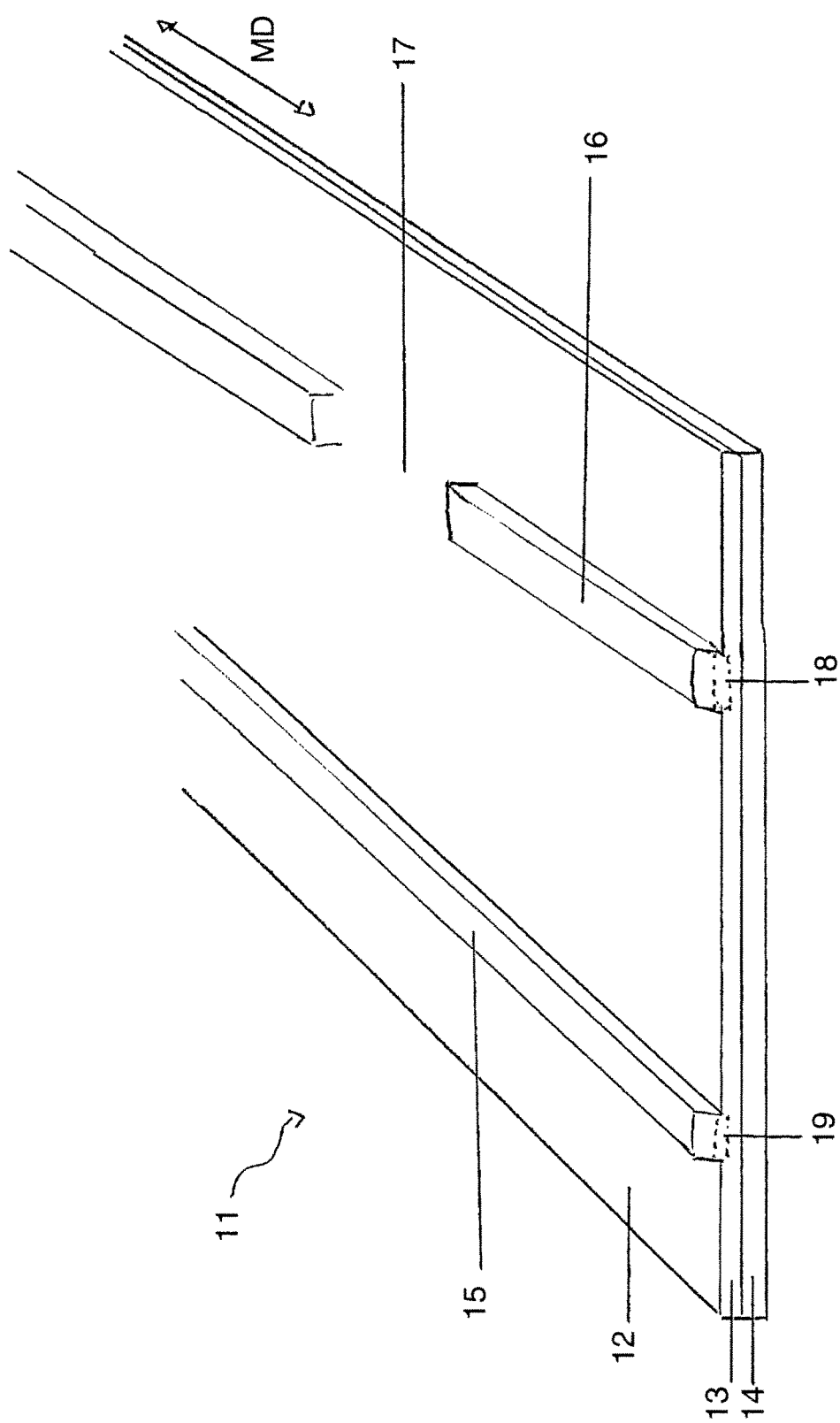
FIG. 1 is a perspective view of a reinforced thermoplastic film in accordance with this invention.

It is noted that for all figures the proportions do not necessarily correspond to actual proportions, but only representative schematic illustrations are shown.

DETAILED DESCRIPTION OF THE INVENTION

It should be noted that all embodiments and preferred features of the present invention recited herein may apply to the above-mentioned aspects of the invention and may be combined as appropriate.

The thermoplastic film of the current invention is reinforced with fibre elements and has controllable properties such as, tensile strength, elongation at break, tear resistance, coefficient of friction and weight per square meter, through the tunable properties of the fibre elements. Such a reinforced thermoplastic film is ideally suited for use in pallet and food wrapping, product unitization, baling hay and barrier film applications. Said thermoplastic film preferably does not apply to any garment or disposable garment applications.

The reinforced thermoplastic film for flexible packaging of the present invention comprises a base film which is preferably an extruded mono or multilayered stretchable or pre-stretched film. Said base film is preferably not an elastic non-woven or spun-bonded type.

When the base film is a multi-layer film it may be multi-layer symmetrical, for example, ABCBA structure or asymmetrical, for example ABCDE structure, or partially symmetrical, for example, ABCBE wherein each of A, B, C, D and E represent a different type of layer in the multi-layer film. Preferably the stack of the multilayer is symmetrical with regard to the central layer. In specific embodiments selected layers are repeated along the thickness. Preferably the multilayer is a three layer stack with an ABA or an ABC stack, wherein A, B and C represent the different materials of the layers. In a preferred specific embodiment layer B comprises a plethora of symmetrical or asymmetrical layers.

As used herein, "a different type of layer" is used to denote one or more different chemical or physical characteristic of the layer selected from the group including thickness, density, melt index, chemical composition, polymer type, major melting peak, crystallisation temperature, and the like.

The major melting peak refers to the major peak of the melting curve in a heat-flow versus temperature graph of said polymer obtained by means of Differential Scanning calorimetry (DSC). The major melting peak was calculated using a Mettler Toledo $DSC822^e$ model at a heating rate of 10° C./min under nitrogen atmosphere. Sample of 10-15 mg of said polymer was heated up to 190° C. followed by its cooling at around −70° C. with a cooling rate of 10° C./min under nitrogen atmosphere. During the second heat up to the melt, the major melting peak was identified and its position upon the temperature scale was reported Preferably, the reinforced thermoplastic film of the present invention comprises a base film which is an extruded multilayered stretchable or pre-stretched film. The base film may have 3+2 m layers, where m is a natural number such as 0, 1, 2, 3, 4 . . . . Preferably, the base film has 3, 5, 7, 9, 12, 15, 17, 19, 21, 23, 25 or 27 layers, more preferably 3, 5 or 7 layers, more preferably 3 or 5 layers, most preferably 5 layers.

Preferably, the base film has a symmetrical (ABA for a three layer film; ABCBA for a five layer film) structure, wherein each of A, B and C represent a different type of layer in the multi-layer film. Preferably the stack of the multilayer is symmetric with regards to the central layer.

A further preferred base film is one having a five layer asymmetric structure (for example ABCDE), wherein each of A, B, C, D and E represent a different type of layer in the film. In the ABODE structure, layers B and D may be made of the same composition and/or be of the same thickness.

A further preferred base film is one having a three layer asymmetric structure (for example ABC), wherein each of A, B and C represent a different type of layer in the film.

For the above ABA layer structure, the layer A is preferably present in the range of 5-30% of the base film thickness, preferably 5-20%, preferably 10-15% thereof. The layer B is preferably present in the range of 40-90% of the base total film thickness, preferably 60-90%, preferably 70-80% thereof.

For the above ABC layer structure, the layer A is preferably present in the range of 5-30% of the base film thickness, preferably 5-20%, preferably 10-15% thereof. The layer B is preferably present in the range of 40-90% of the base total film thickness, preferably 60-90%, preferably 70-80% thereof. The layer C is preferably present in the range of 5-30% of the base total film thickness, preferably 5-20%, preferably 10-15% thereof.

For the above ABC layer structure, the layer A is preferably a slip layer, the layer B is preferably a core layer and the layer C is preferably a cling layer.

For the above ABA layer structure, preferably the density of layer B>layer A.

For the above ABC layer structure, preferably the density of layer A>layer C. For the above ABC layer structure, preferably the major melting peak point of layer A>layer C. For the above ABC layer structure, preferably the density of layer A≥layer B>layer C. For the above ABC layer structure, preferably the major melting peak of layer A≥layer B>layer C.

For the above ABC layer structure, preferably the density of layer A is greater than 0.916 $g/cm^3$, the density of layer B is preferably in the range of 0.916-0.938 $g/cm^3$, and the density of layer C is preferably in the range of 0.870 $g/cm^3$ to 0.905 $g/cm^3$.

For the above ABC layer structure, preferably layer A comprises greater than 50% by weight of LLDPE (Linear Low Density Polyethylene), preferably greater than 75%, preferably greater than 90%, preferably substantially 100% LLDPE. Preferably, the LLDPE of layer A, and where other materials to LLDPE are present, layer A itself, has a density of greater than 0.916 $g/cm^3$, preferably 0.916-0.938 $g/cm^3$, preferably about 0.923 $g/cm^3$. Preferably, the LLDPE of layer A, and where other materials to LLDPE are present, layer A itself has a major melting peak in the range of 95° C.-145° C., preferably 105° C.-130° C., more preferably about 120° C.

For the above ABC layer structure, preferably layer B comprises greater than 50% by weight of LLDPE (Linear Low Density Polyethylene), preferably greater than 75%, preferably greater than 90%, preferably substantially 100% LLDPE. Preferably, the LLDPE of layer B, and where other materials to LLDPE are present, layer B itself has a density in the range of 0.916-0.938 $g/cm^3$, preferably 0.918-0.922 $g/cm^3$, preferably about 0.920 $g/cm^3$. Preferably, the LLDPE of layer B, and where other materials to LLDPE are present, layer B itself has a major melting peak in the range of 90° C.-130° C., preferably 95° C.-125° C., more preferably about 117° C.

For the above ABC layer structure, preferably layer C comprises greater than 20% by weight of VLDPE or ULDPE (Very Low Density Polyethylene or Ultra Low Density Polyethylene), or a mixture thereof, preferably greater than 50%, preferably greater than 75%, preferably substantially 100% VLDPE or ULDPE. Most preferably, layer C comprises ULDPE. Preferably, the ULDPE of layer C, and where other materials to ULDPE are present, layer C itself has a density in the range of 0.870 $g/cm^3$ to 0.890 $g/cm^3$, preferably 0.875-0.885 $g/cm^3$, preferably about 0.880 $g/cm^3$. Preferably, the VLDPE of layer C, and where other materials to VLDPE are present, layer C itself has a density in the range of 0.875 $g/cm^3$ to 0.905 $g/cm^3$, preferably 0.900-0.905 $g/cm^3$, preferably about 0.902 $g/cm^3$. Preferably, the VLDPE of layer C, and where other materials to VLDPE are present, layer C itself has a major melting peak in the range of 70° C.-130° C., preferably 80° C.-125° C., more preferably about 100° C. Preferably, the ULDPE of layer C, and where other materials to ULDPE are present, layer C itself has a major melting peak in the range of 50° C.-110° C., preferably 60° C.-100° C., more preferably about 70° C. The cling properties can be increased by increasing the percentage of ULDPE in the cling layer.

For the above ABODE layer structure or the ABCDA structure or the ABCBE structure or the ABCBA structure, the layer A is preferably present in the range of 2-30% of the base film thickness, preferably 5-15% thereof. The layer B is preferably present in the range of 5-40% of the base film thickness, preferably 10-30% thereof. The layer C is preferably present in the range of 20-80% of the base film thickness, preferably 30-60% thereof, more preferably 35-55% thereof. The layer D (where present) is preferably present in the range of 5-40% of the base film thickness, preferably 10-30% thereof. The layer E (where present) is preferably present in the range of 2-30% of the base film thickness, preferably 5-15% thereof.

For the above ABODE layer structure, the layer A is preferably a slip layer, the layer B is preferably an intermediate layer and the layer C is preferably a core layer, layer D is an intermediate layer and layer E is preferably a cling layer. Preferably, the ULDPE of layer E, and where other materials to ULDPE are present, layer E itself has a major melting peak in the range of 50° C.-110° C., preferably 60° C.-100° C., more preferably about 70° C. The cling properties can be increased by increasing the percentage of ULDPE in the cling layer.

For the above ABODE layer structure, preferably the density of layer A>layer E. For the above ABODE layer structure, preferably the major melting peak of layer A>layer E. For the above ABODE layer structure, preferably the density of layer A≥layer C>layer E. For the above ABODE layer structure, preferably the major melting peak of layer A≥layer C>layer E.

For the above ABODE layer structure, layer A preferably has a density in the range of 0.916-0.938 g/cm³, layer B preferably has a density of greater than 0.916 g/cm³, layer C preferably has a density of greater than 0.916 g/cm³, layer D preferably has a density of greater than 0.916 g/cm³, layer E preferably has a density in the range of 0.870 g/cm³ to 0.905 g/cm³.

For the above ABODE layer structure, preferably layer A comprises greater than 50% by weight of LLDPE (Linear Low Density Polyethylene), preferably greater than 75%, preferably greater than 90%, preferably substantially 100% LLDPE. Preferably, the LLDPE of layer A, and where other materials to LLDPE are present, layer A itself has a density of greater than 0.916 g/cm³, preferably 0.916-0.938 g/cm³, preferably about 0.923 g/cm³. Preferably, the LLDPE of layer A, and where other materials to LLDPE are present, layer A itself has a major melting peak in the range of 95° C.-145° C., preferably 105° C.-130° C., more preferably about 120° C.

For the above ABCDE layer structure, preferably layer B may be any polyolefin, preferably a polyethylene, and preferably comprises greater than 50% by weight of LLDPE (Linear Low Density Polyethylene), preferably greater than 75%, preferably greater than 90%, preferably 100% LLDPE. In certain embodiments layer B is the same composition and/or thickness as layer D, as described herein.

For the above ABODE layer structure, preferably layer C comprises greater than 50% by weight of LLDPE (Linear Low Density Polyethylene), preferably greater than 75%, preferably greater than 90%, preferably substantially 100% LLDPE. Preferably, the LLDPE of layer C, and where other materials to LLDPE are present, layer C itself has a density in the range of 0.916-0.938 g/cm³, preferably 0.918-0.922 g/cm³, preferably about 0.920 g/cm³. Preferably, the LLDPE of layer C, and where other materials to LLDPE are present, layer C itself has a major melting peak in the range of 90° C.-130° C., preferably 95° C.-125° C., more preferably about 117° C.

For the above ABCDE layer structure, preferably layer D may be any polyolefin, preferably a polyethylene, and preferably comprises greater than 50% by weight of LLDPE (Linear Low Density Polyethylene), preferably greater than 75%, preferably greater than 90%, preferably 100% LLDPE. In certain embodiments layer D is the same composition and/or thickness as layer B, as described herein.

For the above ABCDE layer structure, preferably layer E comprises greater than 20% by weight of VLDPE or ULDPE (very Low Density Polyethylene or ultra Low Density Polyethylene), preferably greater than 50%, preferably greater than 75%, preferably substantially 100% VLDPE or ULDPE. Most preferably, layer E comprises substantially ULDPE. Preferably, the ULDPE of layer E, and where other materials to ULDPE are present, layer E itself has a density in the range of 0.870 g/cm³ to 0.890 g/cm³, preferably 0.875-0.885 g/cm³, preferably about 0.880 g/cm³. Preferably, the VLDPE of layer E, and where other materials to VLDPE are present, layer E itself has a density in the range of 0.890 g/cm³ to 0.905 g/cm³, preferably 0.900-0.902 g/cm³, preferably about 0.902 g/cm³. Preferably, the VLDPE of layer E, and where other materials to VLDPE are present, layer E itself has a major melting peak in the range of 70° C.-130° C., preferably 80° C.-125° C., more preferably about 100° C. Preferably, the ULDPE of layer E, and where other materials to ULDPE are present, layer E itself has a melting point in the range of 50° C.-110° C., preferably 60° C.-100° C., more preferably about 70° C. The cling properties can be increased by increasing the percentage of ULDPE in the cling layer.

For the above ABCDE layer structure, B, C and D can comprise nanolayers. The technology of producing nanolayers is described in more detail in US2009/0104424.

For the above ABC layer structure, preferably layer A comprises more than one layer. Preferably layer A is comprised of 1 or 2 or 3 or up to n layers, wherein n belongs to natural numbers. Thus, layer A is comprised of the layers $A_1$, $A_2$, $A_3$, up to $A_n$, wherein n belongs to natural numbers. The layers $A_1$ up to $A_n$ are preferably produced by separate extruders, by the same extruder or by any combination thereof. Preferably layer $A_1$ is the outer layer of layer A, wherein the materials used in layer $A_1$ are these compounded in layer A of an ABC layer stack. Preferably the density of layer $A_1$ is that of said layer A of an ABC layer stack. Preferably the major melting peak of the materials compounded in layer $A_1$ is that of said layer A of an ABC layer stack.

For the above ABC layer structure, preferably layer B comprises more than one layer. Preferably layer B is comprised of 1 or 2 or 3 or up to k layers, wherein k belongs to natural numbers. Thus, layer B is comprised of the layers $B_1$, $B_2$, $B_3$, up to $B_k$, wherein k belongs to natural numbers. The layers $B_1$ up to $B_k$ are preferably produced by separate extruders, by the same extruder or by any combination thereof.

For the above ABC layer structure, preferably layer C comprises more than one layer. Preferably layer C is comprised of 1 or 2 or 3 or up to n layers, wherein n belongs to natural numbers. Thus, layer C is comprised of the layers $C_1$, $C_2$, $C_3$, up to $C_n$, wherein n belongs to natural numbers. The layers $C_1$ up to $C_n$ are preferably produced by separate extruders, by the same extruder or by any combination thereof. Preferably layer $C_1$ is the outer layer of layer C, wherein the materials used in layer $C_1$ are these compounded in layer C of an ABC layer stack. Preferably the density of layer $C_1$ is that of said layer C of an ABC layer stack. Preferably the major melting peak of the materials compounded in layer $C_1$ is that of said layer C of an ABC layer stack.

For the above ($A_1$, $A_2$, $A_3$, up to $A_n$)($B_1$, $B_2$, $B_3$, up to $B_k$)($C_n$, $C_{n-1}$, $C_{n-2}$, down to $C_1$) multi layer stack, preferably the materials used in any layer $A_2$ up to $A_n$ are these compounded in any layer of an ABC layer stack. Preferably the density of any layer $A_2$ up to $A_n$ is that of any layer of an ABC layer stack. Preferably the major melting peak of the materials compounded in any layer $A_2$ up to $A_n$ is that of any layer of an ABC layer stack.

For the above ($A_1$, $A_2$, $A_3$, up to $A_n$)($B_1$, $B_2$, $B_3$, up to $B_k$)($C_n$, $C_{n-1}$, $C_{n-2}$, down to $C_1$) multi layer stack, preferably the materials used in any layer $B_1$ up to $B_k$ are these compounded in any layer of an ABC layer stack. Preferably the density of any layer $B_1$ up to $B_k$ is that of any layer of an ABC layer stack. Preferably the major melting peak of the materials compounded in any layer $B_1$ up to $B_k$ is that of any layer of an ABC layer stack.

For the above $(A_1, A_2, A_3,$ up to $A_n)(B_1, B_2, B_3,$ up to $B_k)(C_n, C_{n-1}, C_{n-2},$ down to $C_1)$ multi layer stack, preferably the materials used in any layer $C_n$ down to $C_2$ are these compounded in any layer of an ABC layer stack. Preferably the density of any layer $C_n$ down to $C_2$ is that of any layer of an ABC layer stack. Preferably the major melting peak of the materials compounded in any layer $C_n$ down to $C_2$ is that of any layer of an ABC layer stack.

The base film is substantially a thin film, the average thickness thereof being preferably in the range 4 μm to 50 μm, more preferably 5 μm to 30 μm, more preferably 6 μm to 30 μm, more preferably 6 μm to 25 μm, more preferably 10 μm to 25 μm.

In certain embodiments the lateral edges of the film, along the machine direction, of said base film are hemmed.

Further the reinforced thermoplastic film comprise a plurality of fibre elements of a fibre material configured to reinforce the base film, wherein the fibre elements are provided at least on one surface of the base film and form an elevated area of material on at least one surface of the base film. Preferably, the reinforcing fibre elements, i.e., the protrusions, are heightened, i.e., protrude, above the plane of the surface of the base film, less than 500 μm on average, more preferably less than 300 μm and most preferably less than 200 μm, on average.

Preferably, the fibres, that is the protrusions, are heightened, i.e., protrude, above the plane of the surface of the base film, greater than 20 μm, more preferably greater than 30 μm and most preferably greater than 40 μm, for example, between 30 μm and 500 μm, more preferably between 50 μm and 300 μm, more preferably between 75 μm and 150 μm, on average.

The reinforcing constituents are fibres or fibre-like elements. "Fibre" or "fibre-like" has the meaning of being elongated elements wherein the cross section of the element has a width in the same order of magnitude in comparison to the height of the element.

The terms "fibre" and "fibre-like" are interchangeable as used herein.

The ratio of the width to height of the fibres prior to application to the base film may be in the range 3:1 to 1:3, more preferably in the range 2:1 to 1:2, more preferably in the range 1.5:1 to 1:1.5, such as in the range about 1:1. The ratio of the largest axis to the smallest axis of the cross-section of the fibre may be less than 3:1, more less than 2:1, more preferably less than 1.5:1, such as about 1:1. This geometry distinguishes these fibre or fibre-like elements for example from strips, bands, ribbons or tapes as reinforcement elements, which have a large width in comparison to the height of the strip. The advantage of such a fibre or fibre-like geometry is the smaller material consumption for a given height, and more tunable properties of the resultant materials. Said fibre or fibre-like elements are distinguished from dots or spots.

The ratio of the average width to the average length of said fibres of the current invention is more than 1:10. Preferably the ratio of the average width to the average length of said elements is greater than 1:50. Preferably the fibre length is continuous with the length of the film. For example, the ratio of the average width to the average length of said elements is in the range of 1:500-1:10,000,000, preferably in the range of 1:50-1:500,000.

The average diameter of the fibre elements is preferably less than 1000 μm, more preferably less than 500 μm, more preferably less than 300 μm and most preferably less than 200 μm. The average diameter of the fibre elements is preferably greater than 20 μm, more preferably greater than 30 μm and most preferably greater than 40 μm, for example, between 30 μm and 500 μm, more preferably between 50 μm and 300 μm, more preferably between 75 μm and 150 μm.

The diameter of the fibres is preferably substantially consistent along their lengths. Thus, the diameter of the fibres preferably does not vary by more than ±50 μm from the average diameter, more preferably does not vary by more than ±10 μm from the average diameter, and most preferably does not vary by more than ±5 μm from the average diameter.

The extruded fibres form one or more protrusions relative to the plane of the base film. Preferably where the average thickness of the base film is less than the average thickness of the protrusions, at least 60% by mass of the protrusions are thicker than the base film, more preferably at least 80% by mass, more preferably at least 90% by mass. Preferably, the thickness of the protrusion, i.e., its protrusion measured from the plane surface of the base film, is not less than the thickness of the base film. Preferably, the average thickness of the protrusion is not less than the average thickness of the base film. Preferably none of the protrusions have a thickness of less than the thickness of the base film.

The fibres may be continuous along the machine direction and therefore each fibre may have the length of the base film. In another embodiment the fibres may be continuous and curved along the machine direction and therefore longer than the length of the base film. In another embodiment, the fibres may be discontinuous along the machine direction and therefore shorter than the length of the base film.

Preferably, each of said fibres covers an area of the base film of more than 4.5 mm$^2$, preferably more than 6.0 mm$^2$, most preferably more than 8.0 mm$^2$. A thermoplastic film may comprise a variety of different lengths of fibres.

Preferably, the fibres of the present invention (which may be used in any of the embodiments or aspects disclosed herein) comprise or consist of co-extruded fibres. The fibres of the present invention are preferably bi-component fibers having a shell/core structure. The shell and core are preferably independently selected from non-polyolefins, polyolefins and polyolefin co-polymers. Preferably, the core comprises polyethylene or polypropylene. Preferably, the shell comprises polyethylene. Preferably, the density of the core is greater than that of the shell. Preferably, the major melting peak of the shell is lower than that of the core. Preferably, the core represents 10-90% by weight of each fibre, more preferably 50-85% by weight of each fibre, more preferably 60-80% by weight of each fibre. Preferably, the shell represents 10-90% by weight of each fibre, more preferably 10-40% by weight of each fibre, more preferably 20-30% by weight of each fibre.

Preferably, the shell of each fibre comprises greater than 50% by weight of LDPE, VLDPE or ULDPE (Low Density Polyethylene, Very Low Density Polyethylene or Ultra Low Density Polyethylene), preferably greater than 75%, preferably greater than 90%, preferably substantially 100% LDPE, VLDPE or ULDPE. Preferably, the LDPE, VLDPE or ULDPE of the shell, and where other materials to LDPE, VLDPE or ULDPE are present, the shell itself has a density in the range of 0.880-0.918, preferably 0.900-0.915 g/cm$^3$. Preferably, the LDPE, VLDPE or ULDPE of the shell, and where other materials to LDPE, VLDPE or ULDPE are present, the shell itself has a major melting peak in the range of 50° C.-100° C., preferably 60° C.-80° C., more preferably about 70° C.

Preferably the core of each fibre comprises greater than 50% by weight of HDPE (High Density Polyethylene), preferably greater than 75%, preferably greater than 90%, preferably substantially 100% HDPE. Preferably, the HDPE of the core, and where other materials to HDPE are present, the core itself has a density of greater than 0.918 g/cm$^3$, preferably in the range of 0.920-0.940 g/cm$^3$, preferably about 0.922-0.925 g/cm$^3$. Preferably, the HDPE of the core, and where other materials to HDPE are present, the core itself has a major melting peak in the range of 100° C.-140° C., preferably 105° C.-130° C., more preferably 108° C.-115° C.

In addition to the fibres or fibre elements, the films of the present invention may further comprise strips, bands and/or tapes for reinforcement, but this is not preferred. The cross-section of such reinforcement elements tends to have a thin rectangular cross-sectional shape on the base film, where the ratio of width to height of the fibre element is high, i.e., greater than 10:1.

Prior to deposition on the base film, the cross-sectional shape of fibres or fibre-like elements of the present invention preferably vary from a circular to an elliptical or oval configuration, most preferably having a substantially circular cross-section. Preferably, the maximum diameter of the fibres does not vary by more than 75%, preferably by more than 50%, more preferably by more than 25%, more preferably by more than 10%, from the minimum diameter of the fibres along the length of a fibre.

Preferably, where an extrusion process is used to form the fibres or fibre-like elements, the fibres or fibre-like elements have a substantially circular cross-section. This cross-section may become more oval in cross-section as the fibres are applied to the base film. Thus, in the second, third and sixth aspects of the present invention, the fibres have a substantially circular cross section prior to application to the base film. In contrast, once the fibre has been applied to the base film (such as in the first aspect of the invention), particularly where pressure has been applied to it, the fibre preferably has a more oval or elliptical cross-section. Such fibres may even have a eye shaped cross-section.

In all cases (i.e., whether the fibres have an oval or elliptical cross-section), the fibres preferably have a ratio of average width to average height of less than 10:1, preferably of less than 5:1, more preferably of less than 3:1, most preferably of less than 2:1.

Where the fibre has been deposited and bonded to the base film, the fibres preferably have a ratio of average width to average protrusion of the fibre from the base film of less than 10:1, preferably of less than 5:1, more preferably of less than 3:1, most preferably of less than 2:1.

Preferably, said reinforced thin film comprising a base film is produced by means of cast or blown extrusion, which preferably has an average thickness of less than 30 μm, preferably less than 23 μm, more preferably less than 19 μm, most preferably about 18 μm, and a plurality of fibre elements on at least one surface of said base film, wherein each fibre element protrudes on average less than 500 μm, preferably less than 300 μm, more preferably less than 200 μm, most preferably less than 170 μm beyond said surface. Each fibre element preferably protrudes on average more than 30 μm, more preferably greater than 50 μm.

Preferably, said reinforced thin film comprises a base film produced by means of cast or blown extrusion, said base film having an average thickness of less than 23 μm, more preferably less than 19 μm, most preferably less than 18 μm, and a plurality of continuous fibre elements on at least one surface of said base film, wherein each fibre element protrudes on average less than 300 μm, more preferably less than 200 μm, most preferably less than 170 μm beyond said surface. Each fibre element preferably protrudes on average more than 30 μm, more preferably greater than 50 μm.

Preferably, a reinforced thin film of the present invention comprising a base film of 18 μm average thickness and 32 longitudinal fibre elements of 270 μm in diameter on average can withstand greater tearing forces, blocking efficiently a tear along the transverse direction at the fibre-like elements, compared to a non-reinforced film of 23 μm average thickness, yielding at the same time a weight reduction of at least 5%.

Preferably, where said reinforced thin film comprises a base film produced by means of cast or blown extrusion, which has an average thickness preferably less than 18 μm, more preferably less than 17 μm, most preferably about 15 μm, and a plurality of fibre elements on at least one surface of said base film, wherein each fibre element protrudes on average less than 300 μm, more preferably less than 200 μm, most preferably less than 170 μm beyond said surface, said reinforced thin film is further stretched in order to produce a reinforced pre-stretched stretch thin film. Each fibre element preferably protrudes on average more than 30 μm, more preferably greater than 50 μm.

Preferably, said reinforced thin film comprises a base film produced by means of cast or blown extrusion, which has an average thickness of preferably less than 18 μm, more preferably less than 14 μm, most preferably less than 9 μm, and a plurality of continuous fibre elements on at least one surface of said base film, wherein each fibre element protrudes on average less than 200 μm, more preferably less than 150 μm, most preferably less than 100 μm beyond said surface. Each fibre element preferably protrudes on average more than 30 μm, more preferably greater than 50 μm.

Preferably, said reinforced thin film comprises a base film produced by means of cast or blown extrusion, which has an average thickness preferably less than 18 μm, more preferably less than 17 μm, most preferably less than 14 μm, and a plurality of continuous fibre elements on at least one surface of said base film, wherein each fibre element protrude on average less than 250 μm, more preferably less than 200 μm, most preferably less than 150 μm beyond said surface, and wherein said reinforced thin film is further stretched in order to produce a reinforced pre-stretched stretch thin film. Each fibre element preferably protrudes on average more than 30 μm, more preferably greater than 50 μm.

As used herein, blown extrusion may be carried out as follows. This process is the same as a regular extrusion process up until the die. The die is preferably an upright cylinder with a circular opening similar to a pipe die. The molten plastic is preferably pulled upwards from the die by a pair of nip rolls high above the die. Changing the speed of these nip rollers will change the gauge (wall thickness) of the film. Around the die sits an air-ring. The air-ring cools the film as it travels upwards. In the centre of the die is an air outlet from which compressed air can be forced into the centre of the extruded circular profile, creating a bubble. This expands the extruded circular cross section by some ratio (a multiple of the die diameter). This ratio, called the "blow-up ratio" can be just a few percent to more than 200 percent of the original diameter. The nip rolls flatten the bubble into a double layer of film whose width (called the "layflat") is equal to ½ the circumference of the bubble. This film can then be spooled or printed on, cut into shapes, and heat sealed.

In the cast film extrusion process, the molten polymer travels through a flat die system to adopt its final flat film shape. The die system is formed by the die and feedblock (if the process requires coextrusion) or simply the die, if the process is that of mono-layer extrusion. The process starts with the feeding of plastic resins by means of a gravimetric feeding system to one or more extruders. The materials are then melted and mixed by the extruders, filtered and fed to the die system. Immediately after exiting the die, the molten curtain enters the cooling unit where its temperature is lowered with a water cooled chill roll to freeze the film. The film is then passed downstream where the edges are trimmed.

Preferably, at least 25%, preferably at least 50% by weight, more preferably at least 75% by weight, for example greater than 80%, 85% or 90% by weight of each fibre or fibre-like element protrudes from the plane surface of the base film to which they are applied.

Preferably, at least 25%, preferably at least 50% by volume, more preferably at least 75% by volume, for example greater than 80%, 85% or 95% by volume of each fibre or fibre-like element protrudes from the plane surface of the base film to which they are applied.

At least a portion of each fibre or fibre-like element is forms an interfacial mixture with the base film. Preferably, at least 10% by weight on average, preferably greater than 20%, preferably less than 70%, preferably less than 50% by weight on average of each fibre or fibre-like element forms an interfacial mixture with the base film. This proportion is measured relative to the plane of the surface of the base film. This ensures good mixing of the polymeric materials, hence good bond strength of the fibres to the base film. This yields high tear strengths compared to base film which have strengthening elements mounted or bonded to their surface, for example, by adhesive.

Preferably, at least 10% on average of the diameter of each fibre forms an interfacial mixture with the base film, i.e., a maximum of 90% of the thickness of the original fibre remains above the surface of the base film. More preferably, at least 20% on average of the diameter of each forms an interfacial mixture with the base film. Preferably, less than 50% on average of the diameter of each fibre does not form an interfacial mixture with the base film.

In a specific embodiment, a reinforced pre-stretched stretch thin film of the present invention comprising a base film of 7 μm average thickness and 32 longitudinal fibre elements of 160 μm in diameter can withstand greater tearing forces, blocking efficiently a tear along the transverse direction at the fibre-like elements, compared to a non-reinforced pre-stretched stretch film of 9 μm average thickness, yielding at the same time a weight reduction of at least 5% compared to the non-reinforced pre-stretched film of about 9 μm average thickness.

In an embodiment, said reinforced thin film comprising a base film is produced by means of cast or blown extrusion, which has an average thickness preferably less than 23 μm, more preferably less than 22 μm, most preferably 19 μm, and a plurality of fibre elements on at least one surface of said base film, wherein each fibre element has an average diameter preferably less than 400 μm, more preferably less than 360 μm, most preferably less than 320 μm. Each fibre element preferably protrudes on average more than 30 μm, more preferably greater than 50 μm.

Preferably, where the width of said base film is less than or equal to 750 mm such as 750 mm to 500 mm, the number of fibre-like elements on the base film surface of said reinforced thin film is 65 or less, such as 65 to 1, preferably 50 to 15, more preferably 45 to 30. In a preferred embodiment the number of said fiber-like elements on the base film of said reinforced thin film is in the range of 8 to 24.

Said reinforced thin film preferably has a base film of high cling property on at least one of its surfaces. The film preferably has an opaque appearance which finds application in agriculture, like wrapping forage and baling hay.

Preferably, the fibres are laid in substantially parallel rows.

Preferably, the fibres are laid in straight lines in the machine direction.

Preferably, where the width of said base film is less than or equal to 500 mm, such as 500 mm to 100 mm, the number of fibre like elements on the base film surface of said reinforced thin film is 38 or less, such as 38 to 4, preferably 30 to 10, more preferably 25 to 15. In preferred embodiments the number of fibre-like elements on the base film of said reinforced thin film is 32. In other embodiments the number of fiber-like elements on the base film of said reinforced thin film is 24.

Preferably, there are more than 3 fibres extruded on the entire base film, more preferably more than 5 fibres, more preferably more than 8 fibres, more preferably more than 10 fibres, more preferably more than 20 fibres. In preferred embodiments wherein said fibre or fibre-like elements are continuous along the machine direction, there are more than 3 of said fibres or fibre-like elements extruded on the base film width, more preferably more than 8 fibers. In specific embodiments wherein said fibre or fibre-like elements are continuous and longitudinal along the machine direction, there are more than 3 of said fibres or fibre-like elements extruded on the base film width, more preferably more than 8 fibers. The number of said continuous and longitudinal fibres or fibre-like elements is less than 2 per centimeter base film width. The number of said continuous and longitudinal fibres or fibre-like elements is preferably less than 1.9 per centimeter base film width or most preferably less than 1.8 per centimeter base film width, such as 0.3, 0.4, 1.2, 1.5 and the like. Preferably, the fibres are laid in substantially parallel rows. Preferably, the fibres are laid in straight lines in the machine direction.

Preferably, in all embodiments disclosed herein, the extruded fibres form a symmetrical arrangement on the width of the film, about a central axis which is parallel to the machine direction.

Preferably, said reinforced thin film comprising a base film produced by means of blown extrusion, which has an average thickness of less than 18 μm, more preferably less than 17 μm, most preferably about 15 μm, and a plurality of fibre elements on at least one surface of said base film, wherein each fibre element has an average diameter of less than 380 μm, more preferably less than 320 μm, most preferably less than 300 μm. Said reinforced thin film having a base film of high cling property on at least one of its surface and an opaque appearance which may find utility in agriculture like wrapping forage and baling hay.

In a preferred embodiment, the ratio of the average width to the average length of said elements of the current invention is in the range of 1:500-1:10,000,000, preferably in the range of 1:50-1:500,000. The ratio of the average width to average height is in the range of 5:1 to 1:1, the average length of the fibres is in the range of 10-1,000,000 mm and the fibres protrude above the plane of the surface of the base film between 50 μm and 300 μm on average. Preferably the fibre length is continuous with the length of the film. In this embodiment, the average thickness of the base film is between 9 and 25 μm, preferably between 12 and 23 μm. Preferably, this embodiment has between 10 and 100 fibres present per m². Preferably these fibres are continuous. In this embodiment, these fibres are preferably formed substantially parallel to one another. In this embodiment, the base film preferably contains between 50 and 1000 perforations per m². Preferably, the perforations form a symmetrical grid pattern. Preferably, the fibres run between the perforations. In this embodiment, the fibres are preferably melt extruded onto the base film and pressed thereon.

Generally, the base film and the fibre elements are preferably prestretched by at least 10%, more preferably by at least 25%, more preferably by at least 50%, more preferably by at least 100%, most preferably by at least 200%, such as about 65%, about 72%, about 106%, about 160%, about 225% and the like. During and after stretching the fibre-like elements remain attached to said base film without debonding or partial debonding from said base film.

The melt flow index (MFI) value of the fibre material may be higher, lower or equal to the base film material MFI value. Where a bicomponent fibre is used, the average melt flow index (MFI) value of the bicomponent fibre material may be higher, lower or equal to the base film material MFI value, preferably equal or higher. The MFI may be measured by ISO1133 or ASTM D 1238.

The density of the fibre material may be higher, lower or equal to the density of the base film material. Where a bicomponent fibre is used, the average density of the shell fibre material may be higher, lower or equal to the density of the base film material, preferably equal or lower. The density may be measured by ASTM D-792, ISO1183 or ASTM D 1505.

The elongation at break of the fibre material may be higher, lower or equal to the elongation at break of the base film material. The elongation at break may be measured by ISO527-3 or ASTM D 882.

The molecular weight distribution value of the fibre material may be higher, lower or equal to the molecular weight distribution value of the base film material.

The deposited fibre elements may possess slip characteristics in order to compensate for the tacking characteristics of the base film. In one embodiment the tacking characteristics is the tacking of the material when it is in contact with itself. The slip characteristic of the fibre elements facilitates the unwinding of the film from its roll more easily.

The fibre elements are preferably bonded onto the base film through heat fusion. During deposition the fibre elements are at a temperature higher than room temperature and close to their crystallisation range, that is, preferably 1-100° C. above their crystallisation point, more preferably 1-80° C., more preferably 10-60° C., more preferably 20-50° C. The crystallisation point may be determined by means of Differential Scanning Calorimetry with a heating rate of 10° C./min.

During the process, the base film material and the reinforcing fibre element material form a connection on a molecular level and are interpenetrated at the interface between the base film material and the fibre element material. Thus, at the location where the fibre elements are provided on the base film, a domain of a material mixture comprising the base film material and the fibre element material is present between a domain of pure base film material and a domain of pure fibre element material such that said fibre elements are formed onto the base film to substantially wet the surface of the base film, interlock or interpenetrate with said base film material and diffuse into the surface of said base film. Thereby a film with an increased tear resistance and strength is achieved compared to reinforced thermoplastic films not having said domain. Furthermore, the claimed films have an increased stability against ripping the fibre elements from the base film compared to prior art films.

It is understood that in the case that the base film and the fibre elements are made of the same material, no mixture of different materials is formed. Nevertheless the interpenetration of the polymer chains occurs. The term "pure base film material" means there is less than 10% by weight of the fibre element material in the domain, preferably less than 5% by weight, more preferably less than 1% by weight, more preferably less than 0.1% by weight of the fibre element material in the domain. The term "pure fibre element material" has an analogous meaning.

Simple application of heat during bonding of a reinforcing element (such as a strip) onto a base film does not automatically create a domain sufficient to withstand tear propagation. Either the heat is not sufficiently high, or exposure time to the heat is not adequate. By depositing fibre or fibre-like elements onto the base film, said elements crystallize from the melt upon positioning them onto said base film, thereby ensuring the heat required to achieve a sufficiently strong domain. Preferably the fibre elements are extruded directly onto the base film. The phrase "are extruded directly" means the fibres are placed on the base film within 30 minutes of their extrusion, preferably within 20 minutes, more preferably within 2 minutes, more preferably within 1 minute, more preferably within 10 seconds, more preferably within 5 seconds, more preferably within 1 second. Preferably, the process is continuous.

In one embodiment, the fibre elements are annealed onto the base film.

The method for producing the reinforced thin film of the present invention preferably involves direct extrusion of about 1:1 to 1.5:1 (ratio width to height) fibre elements onto the thin base film, wherein said base film may be extruded or direct extruded. Said fibre elements are preferably crystallized onto the base film, preferably maintaining their ratio width to height dimension. The average thickness dimension of said thin base film is preferably less than the average height dimension of said fibre element. At the deposition, a thermoplastic film intermediate is produced which may further follow a cooling procedure, supplying the thermoplastic film of the present invention. In this case said thermoplastic film has similar outer dimensions to said thermoplastic film intermediate. Preferably, the fibre elements are pressed shortly after their contact with the base film or most preferably at the contact with the base film such as the ratio width to height of the fibres is altered. In that case the produced thermoplastic film intermediate differs from said thermoplastic film of the present invention regarding the outer dimensions.

One advantage of using fibres of circular or elliptical cross-section is that when they are applied and pressed onto the base film, their shape allows them to wet the surface of the base film more easily than is they had a non-curved surface profile. Thus, by having a curved surface, a small portion of the fibre is initially presented to the film as it is applied, thereby allowing it to sink into the film surface more easily and to create an interfacial mixture with the base film, hence improving the bonding between the film and the fibre. Fibres having a flatter surface profile, e.g. a flat rectangular profile, tend to sit on the surface and can also retain bubbles between the fibre and the base film surface, thereby reducing the bonding between the film and fibre.

The width to height ratio of the fibre-like elements may be more than 2:1. Preferably, the width to height ratio of the fibre-like elements is less than 10:1. Preferably, the pressed fibre-like elements have an average height dimension more than the average thickness dimension of said base film. Preferably, this configuration enables the fibre-like element to act as a tear barrier for a crack that propagates along the base film and meets the fibre-like element at its front.

Said method for producing the reinforced thin film of the present invention preferably uses reinforcing elements (fibres) which are crystallized from the melt during deposition compared to lamination methods where the reinforcing elements are partially heated creating a restricted heat affected zone for bonding. Additionally, simple application of heat during bonding of a reinforcing element (such as a strip) onto a base film does not create automatically a domain sufficient to withstand tear propagation. Either the heat is not sufficiently high, or exposure time to heat may not be adequate. By deposing fibre or fibre-like elements onto the base film, said elements crystallize from the melt upon positioning them onto said base film, thereby ensuring the heat required to achieve a sufficiently strong domain. In the first case the macromolecular diffusion between the compatible fibre material and base material creates a strong interphase (sufficient domain), while in the latter case an interfacial area mainly due to macromolecular chain interlocking appears (insufficient polymer chain mix).

Strips are preformed when applied onto the base film, whereas the fibres of the present invention are preferably extruded onto the base film. There is a different heat requirement to laminate a strip onto a base film, rather than applying an extruded fibre onto a base film. The former case is an endothermic process since heat is required to be transmitted from an outside source for the lamination. The later case is an exothermic process as the heat is transferred from the fibre to the base film.

When a strip is laminated, the heat is applied throughout the surface of the strip and the base film, whereas, when an extruded fibre of the invention is applied, the heat application is only on the contact point of the fibre-base film. A further disadvantage of laminating a strip is that inhomogeneous heat application, that is external one sided heat application, in combination with a thin strip can cause extensive and uncontrollable buckling. The extruded fibre of the invention has the advantage of not requiring external, one sided heat application, therefore extensive and uncontrollable buckling does not occur.

Lamination, as taught by the prior art, is a process where two preformed surfaces come into contact in order to form one thicker surface. This is an endothermic process where heat and pressure from an external source are applied to one or both surfaces. A limitation is that neither of them is heated close to their crystallization point. The amount of heat and time that can be applied is limited in order to reduce the likelihood of buckling, shrinking, swirling and dimensional instabilities. This means that, unlike in the present invention, thermal lamination does not result in sufficient intermixing of the polymer chains. It is therefore necessary to reduce the thickness of the strip to allow heat transfer. Furthermore, external heat is applied to the strip and the base film which can cause degradation of the resulting reinforced film.

In the present invention, the fibre placement is carried out, with the fibre ideally 1-100° C. above its crystallisation point, more preferably 1-80° C., more preferably 10-60° C., more preferably 20-50° C. The fibre itself is a hot element which delivers heat directly to the surface of the film, resulting in fast, efficient, pointed and controllable heat delivery which is not limited to time contact. Accordingly, good intermixing occurs at the fibre:base film interface resulting in the domain of material comprising fibre and base film material. Where a cove/shell fibre is used, preferably at least the shell, and optionally additionally the cove are at the temperatures stated immediately above.

The degree of melting, that is liquidification, at the interface is important to reduce any micro air bubbles that may become trapped between the reinforcement element and the base film. The application of an extruded fibre element, rather than the lamination of a reinforcement strip, reduces the amount of micro air bubbles which become trapped at the reinforcement element:base film interface.

The present invention provides a reinforced film with greater interfacial mixing at the fibre:base film interface than may be achieved by thermal lamination of a reinforcement strip. This interfacial mixing area absorbs the energy associated with a tear and therefore withstands tear propagation. The heat requirements to produce sufficient interfacial mixing would cause dimensional instabilities in both the base film and reinforcement strip when lamination is used. This means that the lamination of a reinforcement strip does not produce sufficient interfacial mixing at the reinforcement element:base film interface, therefore it has inferior tear propagation prevention properties. Even the application of pressure to a reinforcement strip does not compensate for the effectiveness of the hot state fibres of the present invention.

Heat application could have detrimental changes on the process and product design, however, surprisingly, the extruded fibres of the present invention overcome the difficulties associated with the lamination of strips. The present invention additionally withstands tear propagation more effectively than a laminated strip of the prior art.

Preferably, the fibre elements of the reinforced thin film of the present invention have a weight in total which is preferably less than 30% the weight of said base film, or more preferably less than 20% the weight of said base film, or most preferably less than 15% the weight of said base film. Said fibre elements preferably have a basis weight of less than 1 gr/cm$^2$, more preferably less than 0.1 gr/cm$^2$, most preferably less than 0.01 gr/cm$^2$.

This joining mechanism of the base film and the fibre element(s) results in a very strong connection between the fibre element(s) and base film, and there is no need for the large contact areas between the two that is normally required for broader reinforcement elements such as strips, bands or tapes. Further local debonding becomes less probable with the fibre elements in comparison to strips, as fibre elements do not have the same internal stresses as strips. This means that fibre elements are less likely to become debonded from the base film than strips. When strips shrink, they become debonded from the base film, but the fibres do not.

The joining mechanism of the fibres and the base film has the additional advantage that when the interfacial mixing occurs it is not necessary to embed the fibre elements into the base film. The base film and the domain of material mixture have a larger combined thickness than the base film at locations without fibre elements due to inter-diffusion between fibre material and base film.

The ABCDE structure referred to above has particular advantages. One problem associated with depositing hot fibres onto a base film is that if the fibre is too hot and/or if the base film outer layer(s) is too soft, the fibre may penetrate too far into the surface of the film, thereby reducing the integrity thereof and decreasing the tear strength thereof. However, the ABCDE film structure may be provided with an outer layer (A and/or E) which is relatively conducive to bonding with the fibre (by having a relatively low melting point and/or density compared to an adjacent layer in the base film). Such an outer layer may have an adjacent layer (B and/or D) which has a relatively high melting point and/or density. This allows the hot fibre to locally melt and coalesce with the outer layer (A and/or E), but the fibre is not sufficiently hot to penetrate or significantly melt the underlying layer (B and/or D). This allows the retention of the integrity of the core layer (C) and any layers more distal to the outer layer. Such a system is further enhanced when a fibre is used which has a temperature upon deposition onto the base film which is higher than the crystallization temperature of the outer layer (A and/or E), but lower than that of the underlying layer (B and/or D).

This can be further improved when a core-shell bicomponent fibre is used which has a shell made of the same or similar material to that of the outer layer of the base film. Such an arrangement maximizes the interaction hence the bonding of the fibre to the base film. Similar advantages apply to films having greater than 5 layers, i.e. 7, 9, 11, 13, 15, 17 etc.

The use of a core-shell bicomponent fibre has further advantages. For example, where the core has a higher melting point and/or crystallization temperature than the shell, the fibre can be heated to a temperature below the crystallization temperature or melting point of the core, but higher than the crystallization temperature or melting point of the shell. This allows the shell to interact with the outer layer of the base film, hence improving bonding therewith. However, the core does not exceed its crystallization temperature or melting point, hence retains the integrity of the fibre, thereby improving the handling and shape retention thereof.

In a preferred embodiment of the ABA, ABC, ABCDE and ABCBA layer structures of base film referred to above, the outer layer of the base film which is to be bonded to the fibre reinforcement should have a thickness which is ±50%, preferably ±25%, ±10%, of the thickness of the fibre shell. This ensures that an optimum level of mixing of the shell and the outer layer of the base film, thereby improving bonding of the fibre to the base film.

The fibre elements have properties such as, tensile strength, elongation at break, tear resistance, coefficient of friction, weight per square meter, etc., each of which influences the overall properties of the reinforced thermoplastic film. Tuning of base film properties together with fibre element properties ensures the desired performance of the product. Therefore, for example, down-gauging the base film followed by tuning one or more properties of the deposited fibre elements, provides the capability to maintain and further enhance the properties of the final reinforced thermoplastic film. By this method, reduction of the product's weight and cost is achieved, supporting further environmental obligations through lowering waste consumption.

Drawbacks of known thin films are overcome through the improved interface between the deposited fibre elements and the base film. Therefore, even the diameter of the fibre-like reinforcing elements is capable of providing adequate tensile strength. Given the relatively thin diameter of the fibre elements compared to, say, strips, ribs or ribbons, considerable weight reduction is achieved. The said improved interface enables an increased cross-section at the front of a tear when the tear meets a fibre element. This increased cross-section is able to efficiently dissipate the bulk of the input energy. Thus, a tear is hindered or precluded. Consequently, improved tear resistance can be achieved compared to known films in the art, where either the tearing propagates under the reinforcing elements (e.g. reinforcing stripes) or the tearing is not efficiently arrested (e.g. embedded elements in the base film, pressed elements, etc.).

The fibre elements have the function of impacting the overall properties of the base film. This may be achieved by distributing them over the entire base film. "Entire base film" has the meaning that the region is by orders of magnitude larger than the width dimension of the fibres and in this region a plurality of fibre elements are located on a base film. For persons skilled in the art it is obvious that a thermoplastic film with a large area in comparison to the regions may have differing properties in the different region of one area such as being perforated, being supplied with different types of reinforcement elements or even not being reinforced at all. For example a film having an area of 20 m length and 2 m width may have a first portion of 5 m portion with a first characteristic, a second portion of 5 m length with a second characteristic, a third portion of 5 m length with a third characteristic and a fourth portion of 5 m length with a fourth characteristic.

Preferably the fibres cover less than 51% of the surface area of the said surface of the film preferably less than 30%, preferably less than 10%, such as about 48%, about 32%, about 21%, about 9%, about 5% and the like. Preferably the fibres cover more than 0.2% of the surface area of the said surface, preferably more than 2%.

Figure 2A:
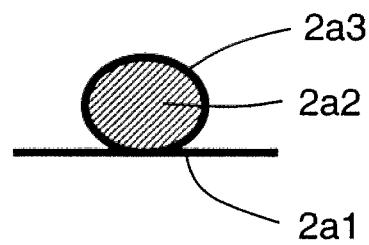
FIG. 2a is a fractional cross-sectional view of a fibre element with an oval cross-section deposited onto a base film.
Figure 2B:
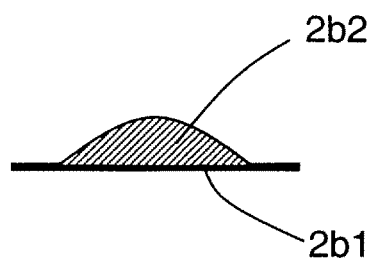
FIG. 2b is a fractional cross-sectional view of a deposited fibre element, which adheres onto a base film.
Figure 2C:
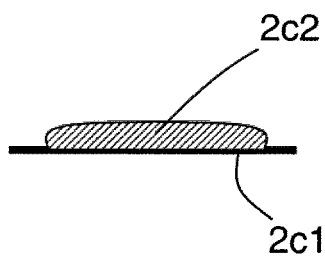
FIG. 2c is a fractional cross-sectional view of a deposited fibre element, which has been pressed onto a base film.

In the prior art, the surface area of the strip, band, tape or similar which is in contact with the base is the same as the upper surface of said strip, band, tape or similar, which is free to contact during application of the film. For fibres or fibre-like elements, the respective surface areas may be different due to the degree of adhesion between said element and base film, which results in the fibre element changing shape as shown in FIGS. 2a, 2b and 2c.

The fibre elements may be located on both surfaces of the base film. The position and degree of coverage of the fibre elements on one surface of the base film may be the same as or different from the position of the reinforcing elements on the other surface of the base film.

A strip, band, tape or similar which is fixed on a base film cannot create a smooth and even surface as the in-plane bending of said element creates folds and wrinkles. On the other hand, fibre and fibre-like elements bend relatively more easily during deposition onto the base-film. Thus, said elements have smooth and even surfaces. This feature enables the manufacturing of several configurations of said fibre or fibre-like elements on said base film. Additionally, said fibre-like elements do not hinder stretching of said reinforced thermoplastic film as opposed to other types of elements like hollow tubes.

The fibre elements are preferably arranged on the same side of the base film. This allows for an efficient and easy manufacturing process.

The fibre elements may be positioned continuously or discontinuously. In different areas of the same reinforced thermoplastic film there may be continuously or discontinuously positioned fibre elements. Furthermore, adjacent fibre elements may be continuously and/or discontinuously positioned. This allows for a further weight reduction of the final product. For example, when the fibre elements yield cling on the base film surface, such as a fibre material of comparatively low density and low tensile property, the fibre elements do not need to be continuous. In an alternative embodiment, the fibre elements provide strength to the film, such as a fibre material with comparatively high density and increased tensile property, a continuous fibre is preferred to yield 'holding force' along the machine direction during application. In some embodiments, a combination of several types of fibre elements might be combined onto the same base film surface.

The fibre elements may be located on the base film parallel to the long edge of the base film, perpendicular to the long edge of the base film or with any random direction. In most cases the long edge is a result of the manufacturing process, that is the machine direction or pulling direction.

The fibre elements may cross each other. The fibre elements may be completely independent of one another. Alternatively, the fibre elements may form woven or non-woven configurations on the surface of the base film. Pluralities of fibre elements may be deposited in a parallel or non-parallel configuration to one another.

When the fibre elements are discontinuously positioned on the base film, the gaps between the fibre elements (that is the areas of the film which do not have fibre elements applied) may form a substantially straight line in the same direction as the positioning direction of the fibre elements. Alternatively, the gaps between the fibre elements may not form a straight line in the same direction as the positioning direction of the fibre elements. These positioning relations between the gaps of the adjacent fibre elements may be both realized in different areas of the same reinforced thermoplastic film. This leads to specific properties in terms of tearing stability and direction. For example, when the gaps between the fibre elements form a straight line in the same direction as the positioning direction of the fibre elements, it will be easier to tear the film along said gap than where the gaps between the fibre elements do not form a straight line and said film is torn. This means films can be made with regions where it is relatively easier and/or to tear a film in a predetermined direction.

The direction of the fibre elements may therefore be selected according to the need to adjust or control a property of the base film. In the case that a rupture upon tearing is required to be hindered in a specific direction, the fibre elements may be oriented vertically to this specific direction to form a tear propagation barrier.

The fibre elements may be positioned straight, curved, waved, zigzag, spiral, in the form of circles or can take any other configuration or contour.

The cross-sectional shape of the fibre elements may vary before and after their deposition onto the base film. Mixtures of fibre cross-sectional shapes may also be used. The related cross-sectional shapes have in practice, obtuse, trimmed and rounded edges. The cross-sectional area may vary along the fibre element. For example by altering the draw-ratio of the fibres during a continuous deposition process alters the deposited fibre mass.

The cross-sectional shape may vary over the length of the fibre elements. Processing of the fibre elements can give extra performance to the final article.

The fibre elements may contain additives. With these additives, specific properties may be achieved for the fibre elements or for the complete reinforced thermoplastic film. The additives in the fibre elements may comprise colouring compounds, tacking inhibitors, tacking intensifiers, corrosion inhibitors, humidity trappers, thermal history indicators, anti-static agents, plant growth promoters and/or weed killer agents or mixtures thereof. Suitable volatile corrosion inhibitors may be compounds such as inorganic nitrides, carbonates, molybdates, amines, triazoles or mixtures thereof. In certain embodiments additives include reinforcing fillers of 0-D, 1-D or 2-D shape, or any combinations thereof. In specific embodiments an appropriate compatibilizer accompanies the additive.

The additives may only be present in the fibre elements.

The fibre elements may be coated. For example, the fibre elements could have a core-shell structure comprising a fibre coated with an organic or inorganic powder. The organic or inorganic powder may be better absorbed when the fibre is in a melt-state. Preferably, said fibres are solid fibres, i.e., not hollow fibers.

Preferably, the thermoplastic film may comprise at least two different types of fibre element. The fibre elements may differ by material, time of application, cross-sectional area, cross-sectional shape, additives, coatings and the like or a mixture of two or more thereof.

The fibre elements and the base film materials may comprise polymers or copolymers, preferably synthetic polymers. Preferably the polymers are polyolefins or non-polyolefins such as polyamides or polyesters. Mixtures of different polyolefins or mixtures of polyolefins with non-polyolefins can also be used. In the latter case compatibilization is preferred. Preferably the polyolefins are independently selected from the group consisting of polyethylene, polypropylene, polyisobutylene, polybutyl-1-ene, poly-4-methylpent-1-ene, polyisoprene, polybutadiene and copolymers and mixtures thereof, preferably ethylene based polymers. More preferably, the polyolefins are polyethylene, more specifically Linear Low Density Polyethylene (LLDPE), Very Low Density Polyethylene (VLDPE), Ultra Low Density Polyethylene (ULDPE) or Low Density Polyethylene (LDPE), produced as known in the art. Fibre elements and base film may be of the same material or different materials. The different layers of multilayer base films may be of the same material or different materials.

Where the base film and the fibre elements are made from the same chemical material, the physical attributes of the base film and the fibre elements may differ. For example, in a preferred embodiment where the base film and the fibre elements are both made from polyethylene, the fibre elements may be made from a different grade of polyethylene to the base material. For example, the base material may be made from LDPE, whereas the fibre elements may be made from a different grade of polyethylene such as LLDPE, VLDPE or ULDPE. In this way, the base film (therefore preferably the bulk of the overall film material) may be made from relatively low grade polymers, whereas the fibre elements (preferably constituting the minority of the material in the overall film) can be made of higher performance material. This results in lower costs films while maintaining the performance thereof.

The reinforced thermoplastic film may be perforated. The holes may have any possible configuration and may vary on one reinforced thermoplastic film. In the method of the present invention, the base film may be a perforated based film prior to the application of the fibre elements. Alternatively, the base film may be perforated after the application of the fibre elements.

The perforations in the film preferably have a maximum diameter (at their widest point) of between 0.1 mm and 100 mm, preferably between 1 mm and 90 mm, more preferably between 5 mm and 70 mm, more preferably between 10 mm and 50 mm.

The fibre elements can be positioned in any configuration and/or number between and/or around the holes. If the holes are arranged in rows, at least one fibre element may be positioned between two adjacent rows of holes.

Where the base film is perforated, the fibre elements are preferably positioned close to the edge of the adjacent hole, for example, less than 5 mm from the edge of the adjacent hole, preferably less than 3 mm from the adjacent hole, more preferably within 1 mm of the edge of the adjacent hole, such as right up to the edge of the adjacent hole.

In an embodiment the fibre elements are contoured around perforations. This means that the fibre elements run on the base film such that they run at least partly along the rim of the holes.

The fibre elements may border and surround each of said holes. This may be achieved by separate elements which are in contact to each other or by individual fibre elements, which may form a ring around the hole. Preferably, for rows of holes, at least two fibre elements encapsulate all holes of one row by being in contact between each hole.

The thermoplastic base film is extruded and may be further processed by blown or cast processing. During deposition of the fibre element(s) on the base film, the temperature of the fibre element is above room temperature and preferably 1-100° C. above their crystallisation point, more preferably 1-80° C., more preferably 10-60° C., more preferably 20-50° C. The deposition may be performed on the base film wherein in the base film is preferably in a molten or at least partially molten state or in the solid state.

Pressure may be applied to the fibre element after deposition on the base film for better fixation of the fibre element on the base film. Further the pressing process may be used to define the cross-section form of the fibre element. This may be achieved by using pressing means for forming the corresponding cross-section. The pressure may be applied by means of a cylinder which can apply pressure to the fibre element at the deposition point. Said cylinder might adjust the height of said fibre element through its fixed position from said base film. The ratio of the thickness (height) to the width of the fibre element after the pressure has been applied may be in the range of 1:3 to 1:10, preferably 1:5 to 1:20, preferably 1:9 to 1:14, such as 1:10, 1:12, 1:3 and the like. Preferably, it is less than 1:10.

A thermoplastic film intermediate may be formed as an interim product, prior to the application of an annealing and/or pressure step. Said intermediate comprises
  (i) an extruded base film comprising a stretchable polyolefin material comprising one or more layers; and
  (ii) a plurality of extruded fibre elements;
  wherein the fibre elements are placed at least on one surface of said base film;
  wherein the extruded fibre elements form one or more protrusions relative to the plane of the base film; and
  wherein the average thickness of the base film is less than the average thickness of the protrusion.

FIG. 1 depicts a perspective view of a reinforced thermoplastic film 11 according to the invention. It should be noted that FIG. 1 does not show one particular embodiment, but several alternatives.

In this first embodiment a base film 12 is provided as a ribbon where the length in the machining direction MD is larger than the width of the film. The base film 12 consists of two layers 13, 14 one above the other forming a multilayer system. Alternatively, only one layer, e.g. layer 13, or more than two layers may be provided.

The base film components may be made of polyolefins or non-polyolefins (base film material). In certain embodiments the base film components are polyethylene and copolymers thereof. The base film is characterized as thin.

On a surface of the base film 12 fibre elements 15, 16 are adhered. The fibre elements 15, 16 may have different characteristics.

In this embodiment the fibre elements 15 and 16 have a rectangular cross-sectional shape, although round or oval cross sections are preferable. The cross-sectional shape of the fibre elements 15, 16 may change before and after their deposition onto the base film. In other embodiments the cross-sectional shape is round, square, elliptical, rectangular or lenticular. The cross-sectional shape of the fibre elements 15, 16 being deposited onto the base film 12 varies according to the degree of adhesion between the fibre elements 15, 16 and the base film 12. This is related to the compatibility of the deposited fibre element 15, 16 and the base film 12 at the conditions of deposition.

In FIG. 2a to FIG. 2c different embodiments of the cross sectional shape of the fibre elements 15, 16 are shown.

In FIG. 2a a cross-sectional shape for a low adhesion between base film 2a1 and fibre element 2a2 is shown. FIG. 2a further shows a coating 2a3 of the fibre element 2a2 surrounding the fibre element 2a2. This coating 2a3 may be varied (in terms of thickness and/or chemical composition) and may be modified to affect the adhesion properties.

FIG. 2b shows a cross-sectional shape for a high adhesion between base film 2b1 and fibre element 2b2. The higher adhesion can be seen from the different contact angle in comparison to FIG. 2a. It is therefore understood that in certain embodiments the cross-sectional shape of the fibre elements may be different compared to other adjacent fibre elements of the said reinforced thermoplastic film. Similarly, the properties of the deposited fibre elements may also be different compared to other adjacent fibre elements of the said reinforced thermoplastic film. The cross-sectional shape will additionally depend on the manufacturing process.

In FIG. 2c a cross-section is shown after pressing fibre element 2c2 on base film 2c1. Thus, before pressing the fibre element 2c2 has been higher elevated over the base film 2c1 and after the pressing there is more area of the base film 2c1 covered with the fibre element 2c2.

Returning to FIG. 1, in FIG. 1 the fibre elements 15 and 16 are oriented parallel to the machine direction MD and have a form of slender threadlike elements. Fibre element 15 runs continuously on the surface of the base film 12, whereas fibre element 16 is discontinuously provided on base film 12. Of course, there are embodiments having exclusively continuous fibre elements 15 or having exclusively discontinuous fibre elements 16 as well as a combination of both fibres. FIG. 1 is showing both types of fibre elements 15 and 16 for illustrative purposes only.

An overview of exemplary orientations is given in FIGS. 3a to 3d.

Figure 3A:
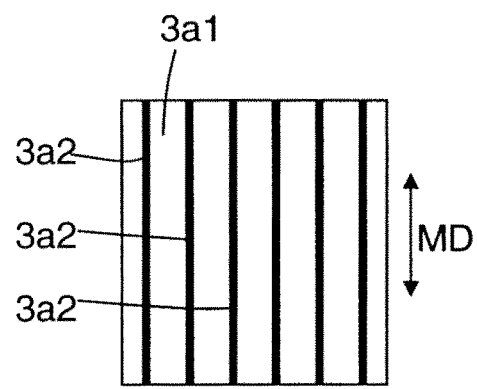
FIG. 3a is a vertical view on a base film having straight fibre elements along the machine direction in accordance with the invention.

Referring to FIG. 3a, a flexible base film 3a1 suitable for packaging is disclosed. Fibre elements 3a2 are provided longitudinally along the machine direction MD.

Figure 3B:
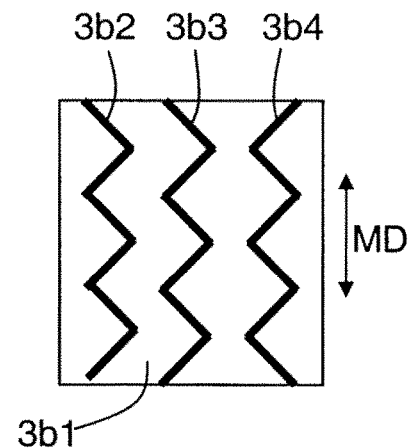
FIG. 3b is a vertical view on a base film having zigzag fibre elements along the machine direction in accordance with the invention.

In another embodiment shown in FIG. 3b fibre elements 3b2 to 3b4 have a zigzag configuration on the base film 3b1 along the machine direction MD. Additionally, the fibre elements are positioned offset side by side, 3b2 and 3b3, or mirrored to each other, 3b3 and 3b4.

Figure 3C:
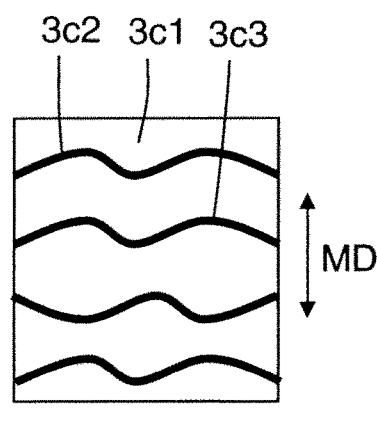
FIG. 3c is a vertical view on a base film having waved fibre elements along the transverse direction of the machine direction in accordance with the invention.

In the embodiment shown in FIG. 3c, the fibre elements 3c2 and 3c3 are waved and placed on the base film 3c1 along the transverse direction relative to the machine direction MD. Moreover, the fibre elements are positioned offset side by side or mirrored to each other.

Figure 3D:
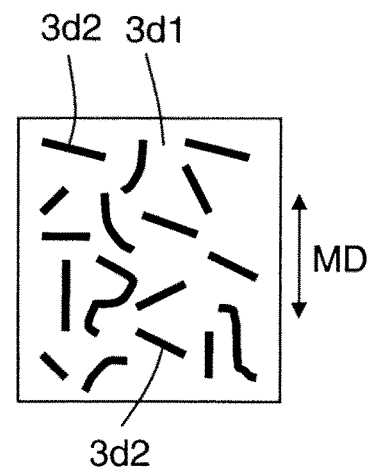
FIG. 3d is a vertical view on a base film having fibre elements randomly dispersed on the surface of a base film in accordance with the invention.

In a certain embodiment shown in FIG. 3d, fibre elements 3d2 are dispersed randomly on the surface of base film 3d1, so as to alter the properties of the film along any direction. Further the individual form of the fibre elements may vary as shown in FIG. 3d.

Figure 4A:
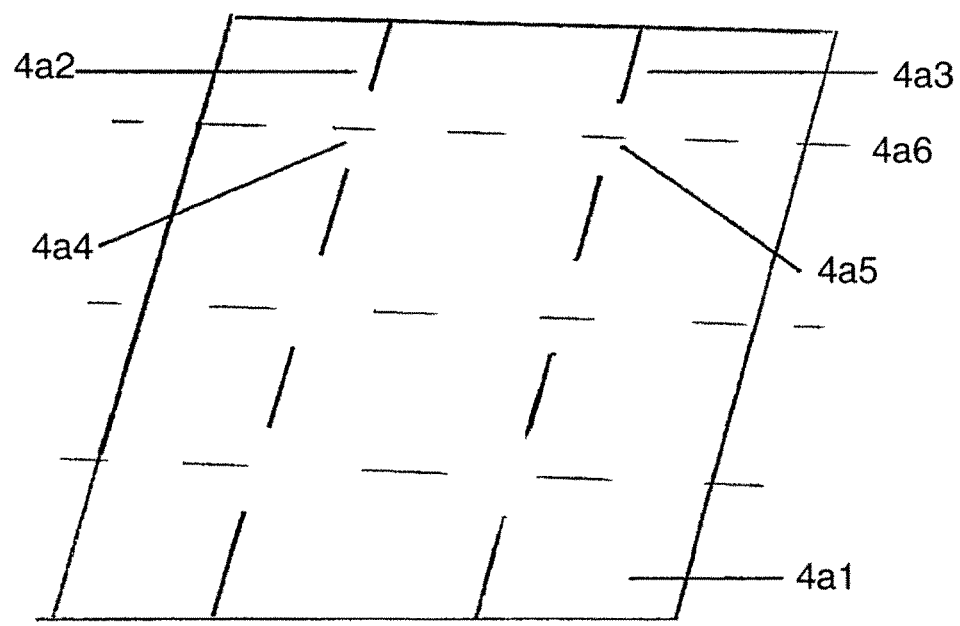
FIG. 4a is a perspective view on a base film having discontinuous fibre elements with gaps in one line in adjacent elements.
Figure 4B:
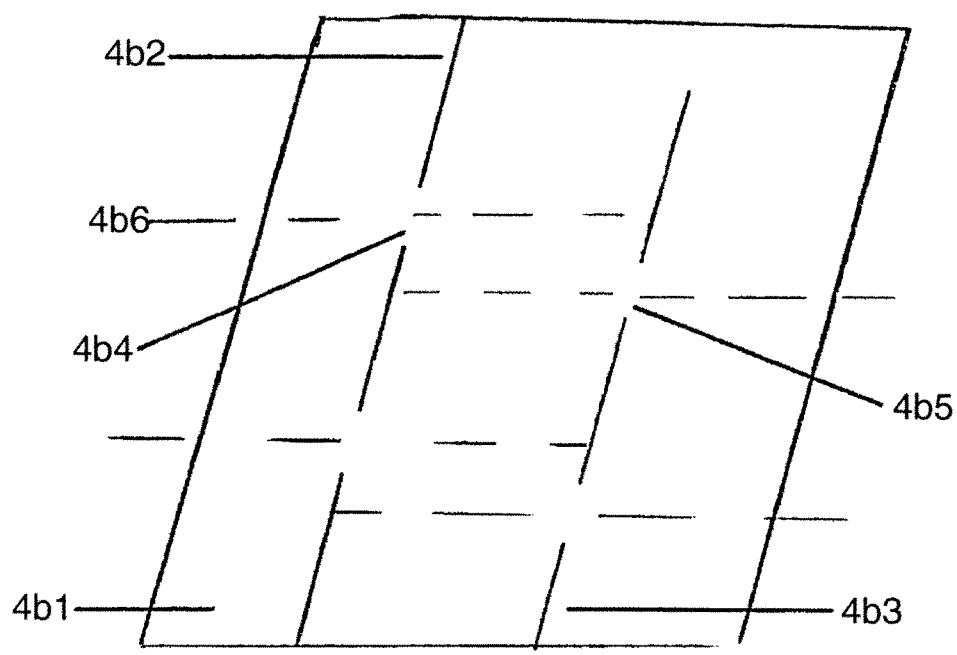
FIG. 4b is a perspective view on a base film having discontinuous fibre elements with no gaps in one line in adjacent elements.

Returning again to FIG. 1, as mentioned above, fibre element 15 is a continuous element whereas the fibre element 16 is a discontinuous element having a gap 17 between the discontinued parts of fibre element 16. FIG. 4a and FIG. 4b show different possible configurations.

In FIG. 4a the discontinuous fibre elements 4a2 and 4a3 are positioned on the film 4a1 such that gaps 4a4 and 4a5 in the elements 4a2 and 4a3, respectively form a straight-line 4a6 vertically to the direction of the fibre elements 4a2 and 4a3.

In another embodiment shown in FIG. 4b, gaps 4b4 and 4b5 in the discontinuous fibre 4h2 and 4b3 are positioned on the film 4b1 in a way such that they are not arranged on a single straight-line vertical to the main direction of the fibre elements 4b2 and 4b3.

FIG. 1 shows further an area 18 and 19 which ensures the high strength of the linkage between fibre elements 15, 16 and base film 12. In a preferred embodiment the fibre elements 15, 16 before deposition have a temperature close to their melting point, such that they fuse onto the base film 12. The advantage of this technique is that the bonding of the fibre elements 15, 16 and the base film 12 goes up to molecular level. More specific, as the deposited fibre elements 15, 16 wet the base, the compatible macromolecular chains of both the polymeric fibre elements 15, 16 and the polymer base film 12 are able to diffuse partially to each other creating a strong interface among them. Therefore, the bonding between the fibre elements 15, 16 and the base film 12 in the current invention is not restricted only in some interlocking phenomena due to e.g. surface roughness, but spreads over to more efficient ways such as van der Waal forces, entangled macromolecular chains and the like. Therefore, even the diameter of the fibre elements 15, 16 is able to provide the adequate tensile strength. Thus the thermoplastic film of the present invention may have equivalent tensile strength to a film not according to the present invention, but have lower weight per area. Thus weight reduction of the film is achieved. The said optimized interface enables an increased cross-sectional area at the front of a tear when the tear meets a deposited fibre element. This increased cross-sectional area is able to efficiently dissipate input energy into the bulk and, thus, a tear is hindered or precluded. Consequently, improved tear resistance can be achieved.

For example, by comparing a reinforced thin thermoplastic film for flexible packaging known art, to the reinforced thin film of the current invention, similar properties as far as the tensile strength and the tear resistance were obtained with a reduction of about 20% in weight for the film of the present invention for the same overall dimensions of the specimens.

Therefore, for a given application with a specific requirement regarding tensile strength and tear resistance, the reinforced thermoplastic film of the invention requires less mass per area than a thin film of the same material without the reinforcing corresponding to this invention.

In another embodiment, fibre elements may be adhered on both surfaces of the base film.

In one embodiment the location of the fibre elements on one side of the base film is the same as the location on the other side of the base film. Thus, the positioning is mirrored. This leads to further emphasized characteristics of the film in comparison to a reinforced thermoplastic film which is only reinforced on one side of the base film.

In another embodiment the fibre elements are not identically located on both surfaces of the film and thus not mirrored relative to the base film. Thus, the characteristics of the reinforced thermoplastic film can be further modified.

The reinforced thermoplastic film may be a perforated film such that holes are provided within the base film.

Figure 5A:
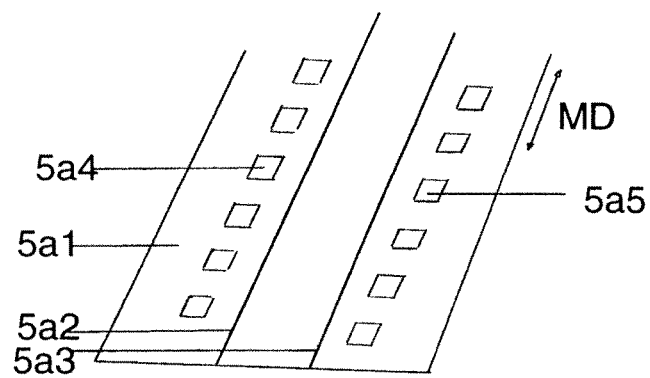
FIG. 5a is a perspective view of a base film having holes staggered along the machine direction and two continuous longitudinal fibre elements between the said rows of holes in accordance with the invention.

The embodiment in FIG. 5a represents a perspective view on a perforated base film 5a1 being reinforced by longitudinal fibre elements 5a2 and 5a3 along the machine direction MD. The two continuous longitudinal fibre elements 5a2 and 5a3 are positioned from both sides of two rows of staggered holes 5a4 and 5a5. The fibre elements 5a2 and 5a3 are positioned close to the holes 5a4 and 5a5, and thus, a tearing is arrested at an early stage, before its catastrophic propagation.

Figure 5B:
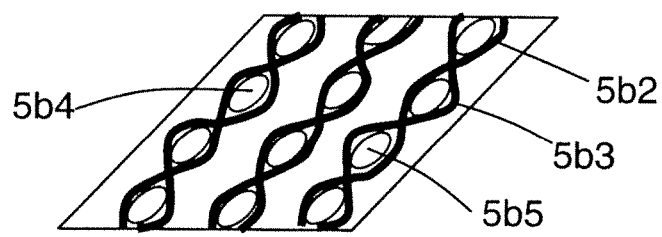
FIG. 5b is a perspective view of a base film having holes staggered along the machine direction and two continuous longitudinal waved and stranded fibre elements to encapsulate each of the said rows of holes in accordance with the invention.

According to the invention, another embodiment is depicted in FIG. 5b. The holes 5b4 and 5b5 are staggered along the machine direction and two continuous longitudinal waved and crossed fibre elements 5b2 and 5b3 encapsulate each of the said rows of holes 5b4 and 5b5.

Figure 5C:
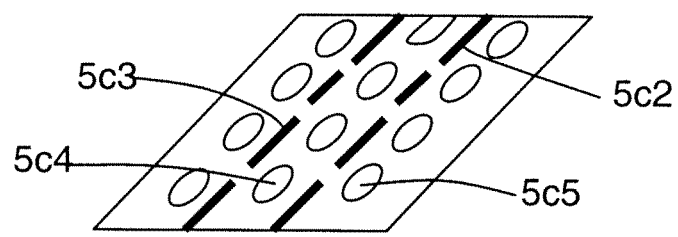
FIG. 5c is a perspective view of a base film having holes staggered along the machine direction and one discontinuous row of fibre elements between the said rows of holes in accordance with the invention.

In another embodiment shown in FIG. 5c, one row of a discontinuous longitudinal fibre element 5c2 is positioned between two rows of staggered holes 5c4 and 5c5. In this case, weight reduction is accomplished due to fibre elements' discontinuity. At the same time a tear has to propagate through a tortuous path specified by the arrangement of the discontinuous fibre elements 5c2, 5c3, thus, energy absorption in the bulk is fulfilled.

Figure 5D:
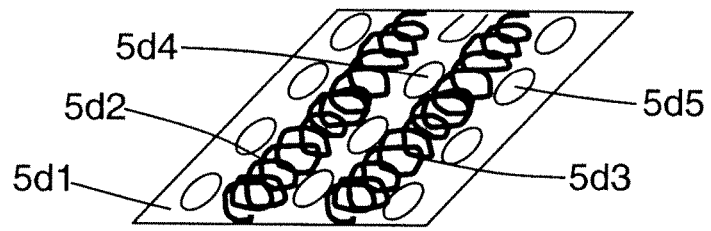
FIG. 5d is a perspective view of a base film having holes staggered along the machine direction and one continuous row of spiral shaped fibre element between the said rows of holes in accordance with the invention.

In a certain embodiment, as depicted in FIG. 5d, the fibre elements 5d2 and 5d3, which are among the rows of staggered holes 5d4 and 5d5, are spiral-shaped. In that case, the stretch base film 5d1 is efficiently reinforced along both the longitudinal and the transverse direction.

Figure 5E:
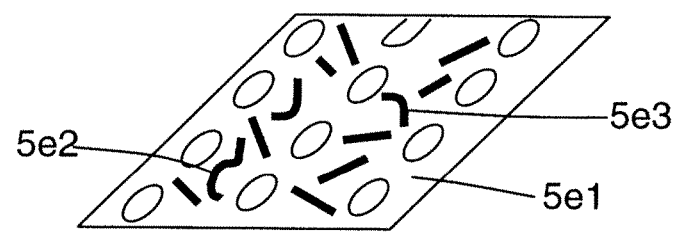
FIG. 5e is a perspective view of a base film having holes staggered along the machine direction and several fibre elements randomly dispersed on the surface of the base film in accordance with the invention.

For weight reduction purposes, a random dispersion of fibre elements 5e2 and 5e3 on the surface of the base film 5e1, as depicted in FIG. 5e, can be used. A combination of various fibre element types (5e2, 5e3) can be used.

Figure 5F:
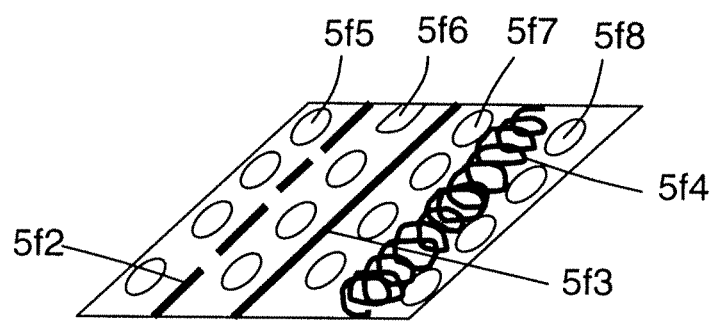
FIG. 5f is a perspective view of a base film having holes staggered along the machine direction and a combination of a continuous longitudinal, a continuous spiral shaped and a discontinuous longitudinal fibre element each one between the said rows of holes in accordance with the invention.

As schematically shown in FIG. 5f, a continuous longitudinal fibre element 5f3, a continuous spiral-shaped fibre element 5f4 and a discontinuous straight fibre element 5f2 are placed between rows of staggered holes 5f5 to 5f8, respectively. These fibre elements 5f2, 5f3, 5f4 can be selected appropriately by a person skilled in the art according to the needs of use of the final product.

Some preferred uses of this article are in packaging such as in pallet and food wrapping, product unitization, baling hay and barrier film applications. In order to deteriorate properties of the packaging film like weight, cost, haze, etc. or to increase properties like permeation, fluffiness, gloss, etc., down-gauging, that is thickness reduction is used. On the other hand properties like tensile strength, elongation at break and tear resistance should be preserved. Therefore, the fibre elements compensate the properties of the base film, which deteriorate due to down-gauging. Moreover, the fibre elements may have characteristics like tack, colour, etc., which yield to specific behaviour to the article. In a certain embodiment, the deposited elements possess slip characteristics in order to compensate the high tack of the base film. In this way, unwinding of the packaging film from its roll is easily performed. In another embodiment the elements include additives such as corrosion inhibitors, humidity trappers, thermal history indicators, anti-static agents, and the like for demanding packaging applications. Suitable volatile corrosion inhibitors could be inorganic nitrides, carbonates, molybdates, amines, triazoles, etc. In certain embodiments additives such as plant growth promoters, weed killer agents, and the like could be useful for agriculture.

The fibre elements of the current invention have at least one or more characteristics selected from the following, high ultimate tensile properties, tear barrier, tack, slip, colour, plant growth promoter, weed killer, corrosion inhibitor, humidity trapper, thermal history indicator, anti-static and anti-fog characteristics.

Figure 6:
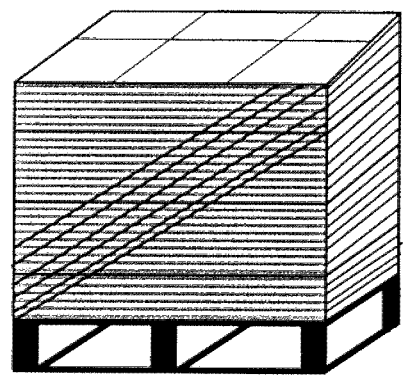
FIG. 6 is a perspective view of products loaded onto a pallet and wrapped by a reinforced thin thermoplastic film in accordance to the invention.

FIG. 6 shows the article of the present invention when used to wrap a pallet. The fibre elements give enhanced force onto the pallet and hold the pallet steady and unitized.

Preferably, the thin thermoplastic film of the current invention provides impact resistance to the wrapped pallet.

Preferably, the reinforced thermoplastic film is manufactured by deposition of the fibre elements onto the solidified base film along the direction, which is required to have altered properties.

Preferably, in the manufacturing method, the fibre elements may be deposited continuously or discontinuously onto the freshly extruded base film along the required direction for the thermoplastic film to have altered properties.

In another embodiment of the manufacturing method the base film is pre-stretched and/or perforated due to the need of the packed products for ventilation, prior to fibre element deposition. The perforations are formed by thermal, mechanical, or any other relative method thereof. The perforations may have various hole geometries such as, round, rhombus, square, elliptical, rectangular, lenticular, and the like and combinations thereof.

Where the base film is perforated, the fibre elements may be positioned close to the edge of the adjacent hole or even more preferably up to the edge of the adjacent hole. Preferably, the elements are contoured around perforations holes.

In another embodiment perforation is conducted after deposition of the fibre element deposition.

For reinforced thermoplastic films with fibre elements on both surfaces of the base film, the elements are deposited at the same time on both surfaces, or first on one surface and then subsequently on the second surface.

The thermoplastic film of the present invention may be used for silage applications or manual packaging applications.

Preferably, the thermoplastic film of the present invention has the one or more fibres deposited on an outer surface thereof, i.e., not laminated between or otherwise positioned between adjacent bonded or adhered films.

It is noted that a highly flexible system with many parameters is provided. Therefore, it is obvious for a person skilled in the art that combining elements of this invention will generate properties, which are not explicitly mentioned in this description, but which are in the scope of this invention.

The invention claimed is:

1. A thermoplastic film comprising:
a base film wherein the base film comprises a stretchable polyolefin material comprising one or more layers; and
a plurality of extruded fibre elements;
wherein the extruded fibre elements are located on at least one surface of the base film;
wherein the extruded fibres form one or more protrusions relative to the plane of the base film;
wherein at the location where the fibre elements are provided on the base film, a domain of a material mixture comprising the base film material and the fibre material is present between a domain of pure base film material and a domain of pure fibre material, such that at least a portion of each fibre element forms an interfacial mixture with the base film;
wherein the average thickness of the base film is less than the average thickness of the protrusion and
wherein the extruded fibres have an oval or elliptical cross section and have a basis weight of less than 1 gr/cm$^2$.

2. The thermoplastic film according to claim 1, wherein the ratio of the average width to the average length of said elements of the current invention is in the range of 1:500-1:10,000,000.

3. The thermoplastic film according to claim 2, wherein the ratio of the average width to the average length of said elements of the current invention is in the range of 1:50-1:500,000.

4. The thermoplastic film according to claim 1, wherein the average diameter of the fibre elements is between 30 microns and 500 microns.

5. The thermoplastic film according to claim 4, wherein the average diameter of the fibre elements is between 50 microns and 300 microns.

6. The thermoplastic film according to claim 5, wherein the average diameter of the fibre elements is between 75 microns and 150 microns.

7. The thermoplastic film according to claim 1, wherein there are at least three fibre elements extruded on the base film.

8. The thermoplastic film according to claim 7, wherein there are at least 8 fibre elements extruded on the base film.

9. The thermoplastic film according to claim 1, wherein each of said fibres covers an area of the base film of more than 4.5 mm$^2$.

10. The thermoplastic film according to claim 9, wherein each of said fibres covers an area of the base film of more than 6.0 mm$^2$.

11. The thermoplastic film according to claim 10, wherein each of the fibres covers an area of the base film of more than 8.0 mm$^2$.

12. The thermoplastic film according to claim 1, wherein the maximum average diameter of the fibres does not vary by more than 75%, from the minimum average diameter of the fibres.

13. The thermoplastic film according to claim 12, wherein the maximum average diameter of the fibres does not vary by more than 50%, from the minimum average diameter of the fibres.

14. The thermoplastic film according to claim 13, wherein the maximum average diameter of the fibres does not vary by more than 25%, from the minimum average diameter of the fibres.

15. The thermoplastic film according to claim 14, wherein the maximum average diameter of the fibres does not vary by more than 10%, from the minimum average diameter of the fibres.

16. The thermoplastic film according to claim 1, wherein the base film and the fibre elements are independently selected from the group consisting of polyethylene, polypropylene, polyisobutylene, polybutyl-1-ene, poly-4-methylpent-1-ene, polyisoprene, polybutadiene and mixtures and copolymers thereof.

17. The thermoplastic film according to claim 16, wherein the base film and the fibre elements are preferably ethylene based polymers.

18. The thermoplastic film according to claim 1, wherein the base film has an ABC, ABA, ABCBA or ABCDE structure, wherein ABCDE are layers having different compositions and/or thicknesses, with the exception that layer D may be the same as layer B.

19. The thermoplastic film according to claim 18, wherein the outer layer A has a lower density and/or crystallization temperature than an adjacent layer of the base film.

20. The thermoplastic film according to claim 1, wherein the fibres have a core-shell structure, wherein the shell has a lower density and/or crystallization temperature than the core.

21. The thermoplastic film according to claim 1, wherein the ratio of the width to the height of the fibre elements is in the range 3:1 to 1:3.

22. The thermoplastic film according to claim 21, wherein the ratio of the width to the height of the fibre elements is in the range 2:1-1:2.

23. The thermoplastic film according to claim 22, wherein the ratio of the width to the height of the fibre elements is in the range 1.5:1-1:1.5.

24. The thermoplastic film according to claim 1, wherein said thermoplastic film is perforated.

25. The thermoplastic film according to claim 1, wherein the average thickness of the base film is in the range 4 microns to 50 microns.

26. The thermoplastic film according to claim 25, wherein the average thickness of the base film is in the range of 5 microns to 30 microns.

27. The thermoplastic film according to claim 26, wherein the average thickness of the base film is in the range of 6 microns to 25 microns.

28. The thermoplastic film according to claim 1, wherein the fibres protrude above the plane of the surface of the base film between 30 microns and 500 microns, on average.

29. The thermoplastic film according to claim 28, wherein the fibres protrude above the plane of the surface of the base film between 50 microns and 300 microns, on average.

30. The thermoplastic film according to claim 29, wherein the fibres protrude above the plane of the surface of the base film between 75 microns and 150 microns, on average.

31. The thermoplastic film according to claim 1, wherein the base film and the fibre element are prestretched by at least 10%.

32. The thermoplastic film according to claim 31, wherein the base film and the fibre element are prestretched by at least 50%.

33. The thermoplastic film according to claim 32, wherein the base film and the fibre element are prestretched by at least 100%.

34. The thermoplastic film according to claim 33, wherein the base film and the fibre element are prestretched by at least 200%.

35. The thermoplastic film of claim 1, wherein the thermoplastic film is provided on a roll.

36. The thermoplastic film of claim 1, for packaging.

37. The thermoplastic film of claim 1, for silage applications.

38. The thermoplastic film of claim 1, for manual packaging applications.

39. The thermoplastic film according to claim 1, wherein at least 10% by weight on average of each fibre forms an interfacial mixture with the base film.

40. The thermoplastic film according to claim 1, wherein less than 70% by weight on average of each fibre forms an interfacial mixture with the base film.

41. The thermoplastic film according to claim 1, wherein the average diameter of the extruded fibre elements is preferably less than 1000 µm.

42. The thermoplastic film according to claim 41, wherein the ratio of the thickness (height) to the width of the fibre element is 1:10 to 3:1.

43. The thermoplastic film according to claim 1, wherein each of the plurality of extruded fibre elements includes a substantially circular cross section prior to application.

44. The thermoplastic film according to claim 1, wherein each of the plurality of extruded fibre elements includes a cross sectional width to height ratio of 3:1 to 1:3 prior to application.

45. The thermoplastic film according to claim 1, wherein the fibres have an oval or elliptical cross section with a ratio of average width to average height of less than 10:1.

46. A thermoplastic film obtainable by the steps comprising:
  (i) extruding a base film comprising a stretchable polyolefin material comprising one or more layers;
  (ii) extruding a plurality of fibre elements;
  (iii) applying the plurality of fibre elements to at least one side of the base film; and
  (iv) bonding the fibre elements to the base film;
  wherein the extruded fibres form one or more protrusions relative to the plane of the base film;
  wherein at the location where the fibre elements are provided on the base film, a domain of a material mixture comprising the base film material and the fibre material is present between a domain of pure base film material and a domain of pure fibre material,
  wherein the average thickness of the base film is less than the average thickness of the protrusion, and
  wherein the extruded fibres have an oval or elliptical cross section and have a basis weight of less than 1 gr/cm$^2$.

* * * * *